(12) United States Patent
Kang et al.

(10) Patent No.: US 12,449,526 B2
(45) Date of Patent: Oct. 21, 2025

(54) METHOD AND DEVICE FOR PERFORMING COMMUNICATION

(71) Applicant: Samsung Electronics Co., Ltd., Suwon-si (KR)

(72) Inventors: Moonseok Kang, Suwon-si (KR); Yi Yang, Suwon-si (KR); Hyunchul Kim, Suwon-si (KR); Jonghoon Jang, Suwon-si (KR); Sukgi Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 18/151,912

(22) Filed: Jan. 9, 2023

(65) Prior Publication Data

US 2023/0161022 A1    May 25, 2023

Related U.S. Application Data

(63) Continuation of application No. PCT/KR2021/006222, filed on May 18, 2021.

(30) Foreign Application Priority Data

Jul. 23, 2020    (KR) .................. 10-2020-0091957

(51) Int. Cl.
   *G01S 13/10*    (2006.01)
   *G01S 13/02*    (2006.01)
(52) U.S. Cl.
   CPC ........ *G01S 13/103* (2013.01); *G01S 13/0209* (2013.01)

(58) Field of Classification Search
   CPC .................. G01S 13/103; G01S 13/0209
   See application file for complete search history.

(56) References Cited

U.S. PATENT DOCUMENTS

2008/0080567 A1    4/2008   Radulescu
2008/0259896 A1   10/2008   Sahinoglu et al.
(Continued)

FOREIGN PATENT DOCUMENTS

JP       2009-206573 A     9/2009
KR       10-1013847 B1     2/2011
(Continued)

OTHER PUBLICATIONS

International Search Report dated Aug. 25, 2021, issued in International Application No. PCT/KR2021/006222.
(Continued)

*Primary Examiner* — Sam Bhattacharya
(74) *Attorney, Agent, or Firm* — Jefferson IP Law, LLP

(57) ABSTRACT

A method and a device are provided. The device includes at least one communication module, a memory, and at least one processor operatively connected to the at least one communication module and the memory, wherein the at least one processor is configured to broadcast a first poll message including a first distance measurement cycle by using the at least one communication module, broadcast a second poll message including a second distance measurement cycle by using the at least one communication module, receive, from at least one external electronic device, a response message including a time-error applied response time, and determine the distance to the at least one external electronic device based on the time error-applied response time.

17 Claims, 16 Drawing Sheets

(56) References Cited

U.S. PATENT DOCUMENTS

| | | |
|---|---|---|
| 2010/0220690 A1 | 9/2010 | Majkowski et al. |
| 2011/0292820 A1 | 12/2011 | Ekbal et al. |
| 2012/0120874 A1 | 5/2012 | McLaughlin et al. |
| 2013/0121173 A1 | 5/2013 | Chen et al. |
| 2014/0314068 A1 | 10/2014 | Wentink et al. |
| 2015/0029873 A1 | 1/2015 | Subramanian et al. |
| 2016/0241373 A1 | 8/2016 | Marri Sridhar et al. |
| 2017/0059701 A1 | 3/2017 | Oh et al. |
| 2017/0078967 A1 | 3/2017 | Asterjadhi et al. |
| 2018/0114441 A1 | 4/2018 | Marmet et al. |
| 2022/0352637 A1* | 11/2022 | Han ................. H04M 1/02 |

FOREIGN PATENT DOCUMENTS

| | | |
|---|---|---|
| KR | 10-1101987 B1 | 1/2012 |
| KR | 10-2014-0067959 A | 6/2014 |
| KR | 10-2014-0093994 A | 7/2014 |
| KR | 10-2015-0098985 A | 8/2015 |
| KR | 10-2016-0039615 A | 4/2016 |
| KR | 10-1836837 B1 | 3/2018 |
| KR | 10-2018-0045831 A | 5/2018 |
| KR | 10-2019-0007206 A | 1/2019 |

OTHER PUBLICATIONS

Korean Office Action dated Jul. 23, 2025, issued in a Korean Patent Application No. 10-2020-0091957.

Jack Lee at al., IEEE P802.15 Wireless Personal Area Networks, IEEE, Dec. 2018.

Ayman Naguib, IEEE P802.15 Wireless Personal Area Networks, IEEE, Mar. 2019.

* cited by examiner

| 2 | 16 | 2 | 16 | 2 | 16 | 2 | 16 |
|---|---|---|---|---|---|---|---|
| 0000 | 0 | 0100 | 4 | 1000 | 8 | 1100 | C |
| 0001 | 1 | 0101 | 5 | 1001 | 9 | 1101 | D |
| 0010 | 2 | 0110 | 6 | 1010 | A | 1110 | E |
| 0011 | 3 | 0111 | 7 | 1011 | B | 1111 | F |

| RESPONSE TIME | AVERAGE DISTANCE | 95% STANDARD DEVIATION | 99% STANDARD DEVIATION | MINIMUM AND MAXIMUM DISTANCES |
|---|---|---|---|---|
| 10 | 77.65 | -/+ 17.96 | -/+ 23.64 | [77.97 76.87] |
| 20 | 77.71 | -/+ 23.09 | -/+ 30.39 | [77.33 79.38] |
| 30 | 77.87 | -/+ 26.10 | -/+ 34.36 | [77.40 79.28] |
| 40 | 77.91 | -/+ 38.06 | -/+ 50.09 | [77.30 78.53] |
| 50 | 77.86 | -/+ 48.05 | -/+ 63.25 | [77.09 78.81] |

| RESPONSE TIME | AVERAGE DISTANCE | 95% STANDARD DEVIATION | 99% STANDARD DEVIATION | MINIMUM AND MAXIMUM DISTANCES |
|---|---|---|---|---|
| 10 | 77.60 | -/+ 11.64 | -/+ 15.30 | [77.28 77.81] |
| 20 | 77.65 | -/+ 6.13 | -/+ 8.54 | [77.47 77.79] |
| 30 | 77.66 | -/+ 8.81 | -/+ 11.58 | [77.56 77.76] |
| 40 | 77.71 | -/+ 12.53 | -/+ 16.47 | [77.49 77.89] |
| 50 | 77.71 | -/+ 9.08 | -/+ 11.93 | [77.57 77.84] |

METHOD AND DEVICE FOR PERFORMING COMMUNICATION

CROSS-REFERENCE TO RELATED APPLICATION(S)

This application is a continuation application, claiming priority under § 365(c), of an International application No. PCT/KR2021/006222, filed on May 18, 2021, which is based on and claims the benefit of a Korean patent application number 10-2020-0091957, filed on Jul. 23, 2020, in the Korean Intellectual Property Office, the disclosure of which is incorporated by reference herein in its entirety.

BACKGROUND

1. Field

The disclosure relates to a method and a device for performing communication.

2. Description of Related Art

With the advancement of digital technology, various types of electronic devices, such as a mobile communication terminal, a personal digital assistant (PDA), an electronic organizer, a smartphone, a tablet personal computer (PC), or a wearable device, are widely used. In order to support and improve the functions of electronic devices, hardware and/or software of electronic devices is continuously being developed.

An electronic device measures the position of each electronic device by a method of two-way ranging (TWR) between two electronic devices in a position (or distance) measurement operation using ultra-wideband (UWB) communication. The TWR method may include a single-sided TWR (SS-TWR) method or a double-sided TWR (DS-TWR) method. In the SS-TWR method, when an electronic device transmits a ranging poll message (or ranging poll data) to an external electronic device (or a counterpart electronic device), the external electronic device transmits a ranging response message to the electronic device, thereby enabling the electronic device to identify the distance from the external electronic device (or the position of the external electronic device). In the DS-TWR method, when the external electronic device transmits a ranging poll message, the electronic device transmits a ranging response message to the external electronic device, and the external electronic device transmits a ranging final message to the electronic device, thereby enabling the external electronic device to identify the distance to the electronic device.

When UWB communication is activated, the electronic device may activate UWB receiver (Rx) and wait since both sides are unable to precisely determine the time to start actual UWB ranging (e.g., an operation of transmitting/receiving a poll, response, or final). As the time to activate the UWB Rx increases or the number of external electronic devices increases, current consumption unnecessarily wasted by the electronic device may increase. Like the electronic device, since the external electronic device is unable to know when to receive a UWB response from the electronic device or another external electronic device and thus needs to activate the UWB Rx and wait, a current consumption issue may arise. To reduce current consumption, the electronic device may perform control to transmit and receive a message for a predetermined time in the entire distance measurement cycle. However, as a response time received from the external electronic device is longer, a time error may occur between the electronic device and the external electronic device, thus reducing the accuracy of distance measurement.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device enabling an electronic device to accurately measure a distance by calculating a time error, based on a distance measurement cycle and a time difference between poll messages, and transmitting a response message in which the time error is reflected in a response time to the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication module, a memory, and at least one processor operatively connected to the at least one communication module and the memory, wherein the at least one processor may be configured may be broadcast a first poll message including a first distance measurement cycle by using the at least one communication module, broadcast a second poll message including a second distance measurement cycle by using the at least one communication module, receive a response message including a response time to which a time error is applied from at least one external electronic device, and determine a distance to the at least one external electronic device, based on the response time to which the time error is applied.

In accordance with another aspect of the disclosure, an electronic device is provided. The electronic device includes at least one communication module, a memory, and at least one processor operatively connected to the at least one communication module and the memory, wherein the at least one processor may be configured to receive a first poll message including a first distance measurement cycle from an external electronic device by using the at least one communication module, receive a second poll message including a second distance measurement cycle by using the at least one communication module, calculate a time error and a response time, based on the first poll message or the second poll message, and transmit a response message including the response time to which the time error is applied to the external electronic device through the at least one communication module.

In accordance with another aspect of the disclosure, an operating method of an electronic device is provided. The operating method includes receiving a message by using at least one communication module of the electronic device, determining whether the received message is a poll message, calculating a time error and a response time when the received message is the poll message, and transmitting a response message including the response time to which the time error is applied to at least one external electronic device transmitting the poll message through the at least one communication module, wherein, in case that the received poll message is a second poll message and a poll message received before the second poll message is a first poll message, the calculating of the time error comprises calculating a difference between a time when the first poll message is received and a time when the second poll message is received, and dividing a first distance measurement cycle included in the first poll message by the calculated difference.

According to various embodiments of the disclosure, when transmitting a response message to a poll message, a time error may be applied to a response time, thereby reducing an error in measuring a distance between an electronic device and an external electronic device.

According to various embodiments of the disclosure, a distance to an external electronic device may be measured based on a response time to which a time error is applied, thereby increasing accuracy of distance measurement.

According to various embodiments of the disclosure, UWB communication may be activated during a time of a contention phase shorter than a distance measurement cycle, thereby reducing current consumption due to the UWB communication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B illustrates a notation table of a message according to an embodiment of the disclosure;

FIG. 6B illustrates a time error table by response time according to a comparative example according to an embodiment of the disclosure;

FIG. 6C illustrates a time error table by response time according to an embodiment of the disclosure;

Throughout the drawings, it should be noted that like reference numbers are used to depict the same or similar elements, features, and structures.

DETAILED DESCRIPTION

Figure 1:
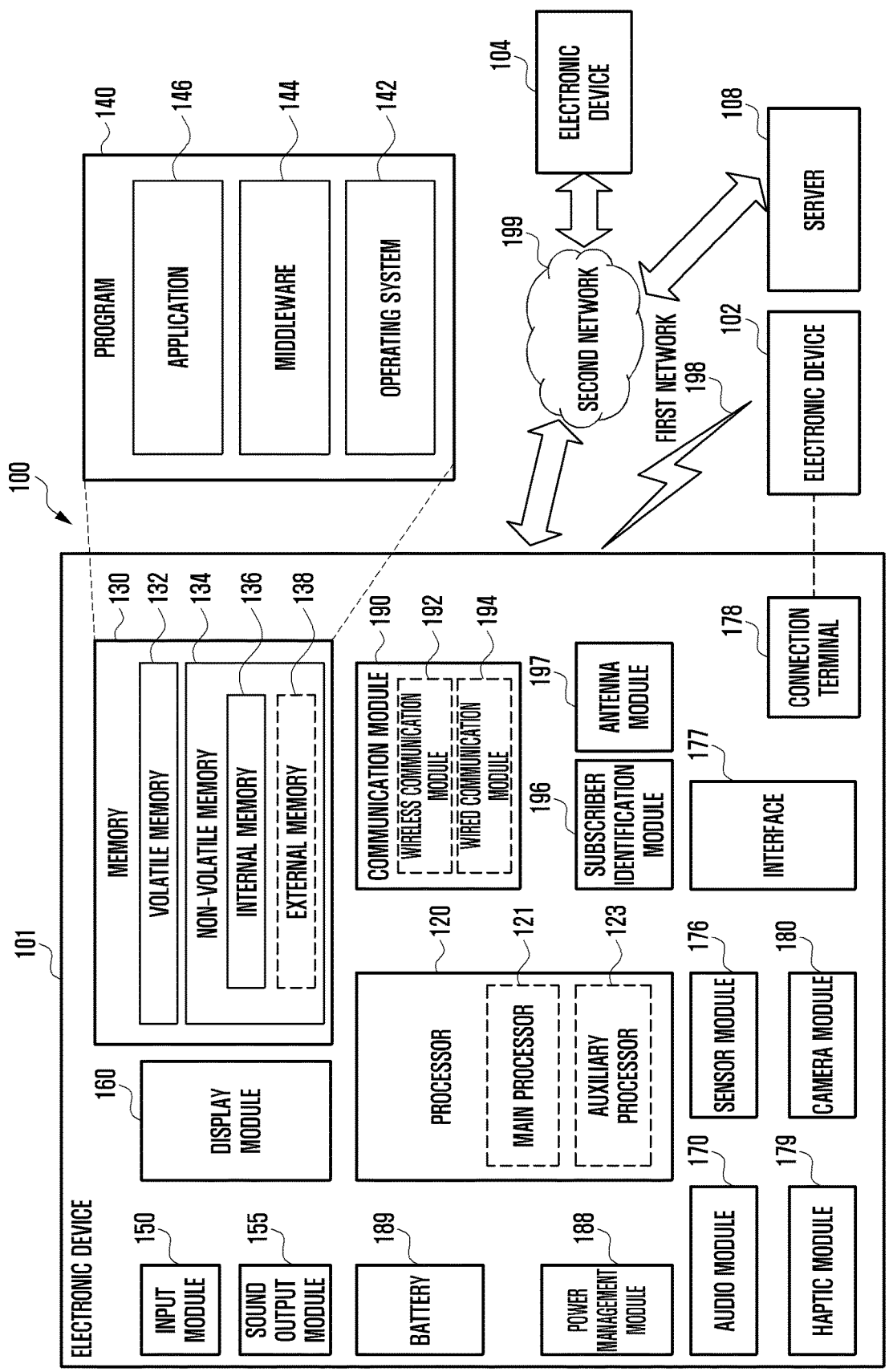
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to certain embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities, and some of the multiple entities may be separately disposed in different components. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may still perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
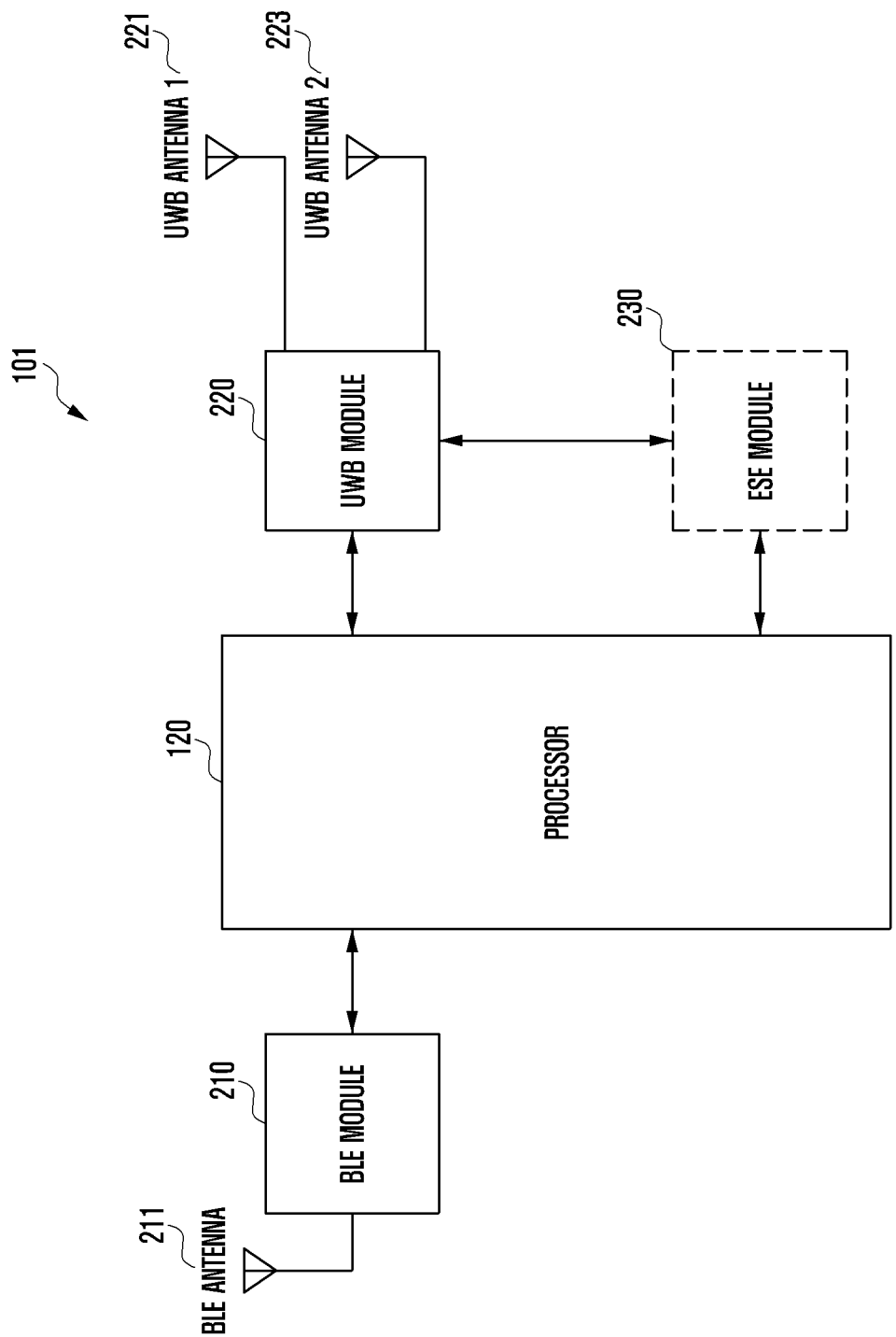
FIG. 2 is a block diagram illustrating hardware of an electronic device according to an embodiment of the disclosure.

FIG. 2 is a block diagram illustrating hardware of an electronic device according to an embodiment of the disclosure.

Referring to FIG. 2, the electronic device (e.g., the electronic device 101 of FIG. 1) according to various embodiments may include a processor 120, a Bluetooth Low Energy (BLE) module 210, a BLE antenna 211, a UWB module 220, a first UWB antenna 221, a second UWB antenna 223, and/or an embedded secure element (eSE)

module 230. According to various embodiments of the disclosure, at least one (e.g., the second UWB antenna 213) among the components included in FIG. 2 may be omitted from the electronic device 101, or one or more other components may be added thereto. The BLE module 210, the UWB module 220, and/or the eSE module 230 may be operatively connected to the processor 120. The BLE module 210 or the UWB module 220 may be included in the communication module 190 of FIG. 1. The BLE module 210 may transmit or receive a BLE signal under control of the processor 120. The BLE module 210 may transmit or receive the BLE signal through the BLE antenna 211.

The ultra-wideband (UWB) module 220 may include a transmitter (TX) module to transmit a UWB signal (e.g., poll, response, or final) for positioning from an external electronic device (e.g., the external electronic device 102 or the external electronic device 104 of FIG. 1) and a receiver (RX) module to receive a UWB signal. The UWB signal may be transmitted or received through the first UWB antenna 221 and/or the second UWB antenna 223. There may be a greater number of UWB antennas than shown in FIG. 2. For example, the UWB signal may be switched to be transmitted and/or received via the first UWB antenna 221 and/or the second UWB antenna 223, based on control of the UWB module 220 and/or the processor 120. The UWB module 220 may operate under control of the processor 120, and may transmit a received UWB signal to the processor 120 or may form a communication path (e.g., a serial peripheral interface) for receiving a control signal from the processor 120.

The embedded secure element (eSE) module 230 may be a module that generates or stores credential information according to circumstances. The eSE module 230 may transmit the generated credential information to the UWB module 220. The eSE module 230 may be connected to the UWB module 220 through I2C communication. The eSE module 230 may be included in or may be disposed outside the UWB module 220.

Figure 3:
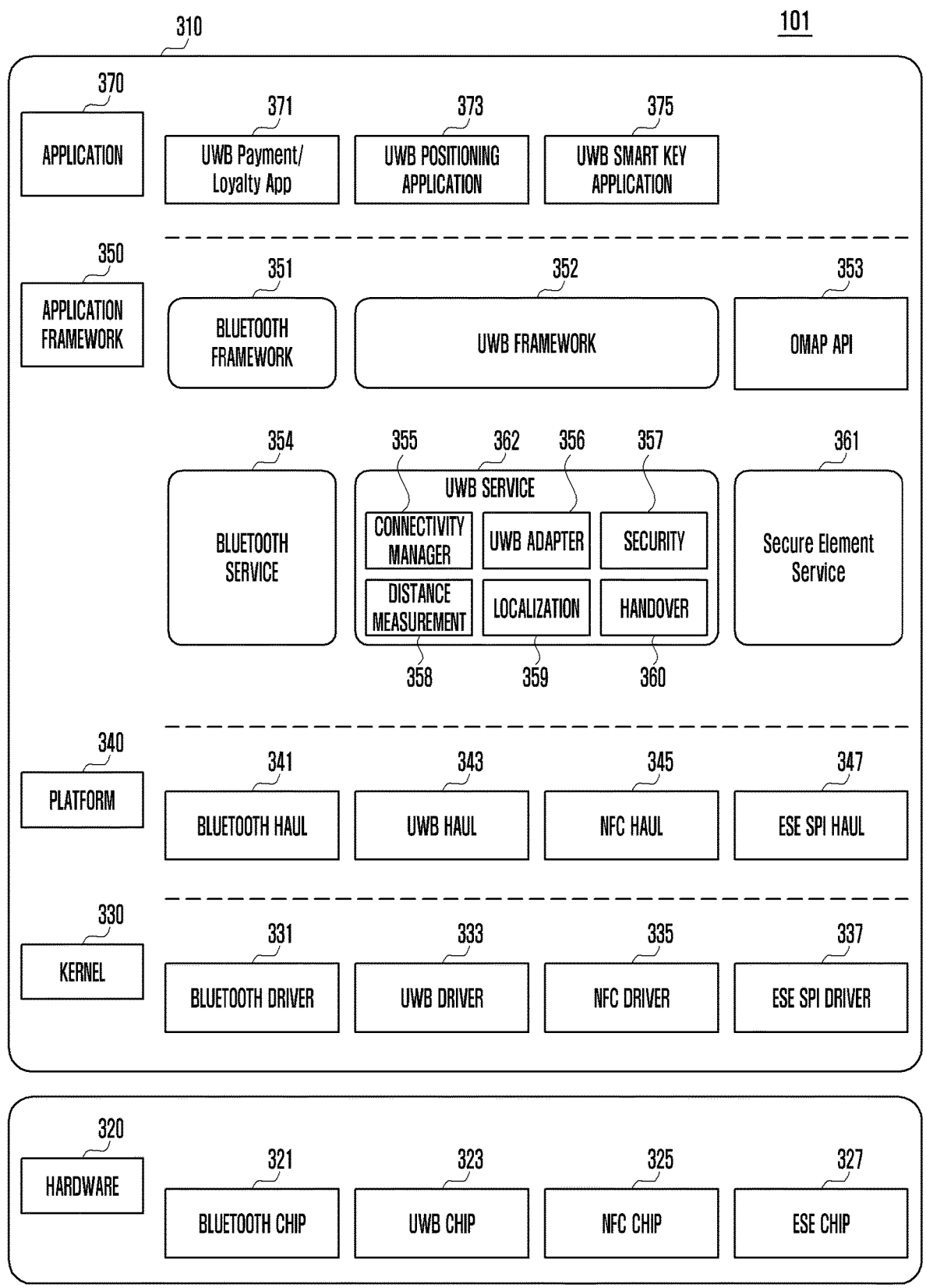
FIG. 3 is a block diagram illustrating a program module of an electronic device supporting a UWB function according to an embodiment of the disclosure.

FIG. 3 is a block diagram illustrating a program module of an electronic device supporting a UWB function according to an embodiment of the disclosure.

Referring to FIG. 3, the electronic device (e.g., the electronic device 101 of FIG. 1) may include an operating system (OS) that controls a resource related to the electronic device 101 and/or a program module 310 including various applications and hardware 320 that run on the operating system. The operating system may be, for example, an operating system including Android, iOS, Windows, Symbian, Tizen, or Bada. FIG. 3 may show the program module 310 and the hardware 320 supporting a UWB function in the electronic device 101 employing an Android operating system.

The program module 310 may include a kernel 330, a platform 340, an application framework 350, or an application 370. At least part of the program module 310 may be preloaded onto the electronic device 101 or may be downloaded from an external electronic device (e.g., the external electronic device 102 or 104 or the server 108). The kernel 330 may include a device driver for driving the hardware 320 (e.g., a Bluetooth chip 321, a UWB chip 323, an NFC chip 325, or an eSE chip 327) of the electronic device 101. The NFC chip 325 and the eSE chip 327 may be configured as one. For example, the device driver may include at least one of a Bluetooth driver 331, a UWB driver 333, an NFC driver 335, or an eSE SPI driver 337. The platform 340 may include at least one of a Bluetooth haul 341, a UWB haul 343, an NFC haul 345, or an eSE SPI haul 347 for controlling the device driver of the kernel 330.

The application framework 350 may provide a function commonly required by the application 370 or may provide various functions to the application 370 so that the application 370 may efficiently use limited system resources inside the electronic device 101. For example, the application framework 350 may include a Bluetooth framework 351, a UWB framework 352, an open multimedia applications platform (OMAP) API 353, a Bluetooth service 354, a secure element service 361, and a UWB service 362. The UWB service 362 may include a connectivity manager 355, a UWB adapter 356, security 357, distance measurement 358, localization 359, or handover 360 for supporting a UWB-related API. The electronic device 101 may measure the positions of a plurality of external electronic devices using the UWB adapter 356, the distance measurement 358, or the localization 359.

The application 370 may include a UWB payment/loyalty application 371, a UWB positioning application 373, and a UWB smart key application 375.

An electronic device (e.g., the electronic device 101 of FIG. 1) according to various embodiments may include at least one communication module (e.g., the communication module 190 of FIG. 1), a memory (e.g., the memory 130 of FIG. 1), and a processor (e.g., the processor 120 of FIG. 1) operatively connected to the at least one communication module and the memory, wherein the processor may be configured to broadcast a first poll message including a first distance measurement cycle by using the at least one communication module, broadcast a second poll message including a second distance measurement cycle by using the at least one communication module, receive a response message including a response time to which a time error is applied from at least one external electronic device, and determine a distance to the at least one external electronic device, based on the response time to which the time error is applied.

The time error may be calculated by calculating a difference between a time when the at least one external electronic device receives the first poll message and a time when the at least one external electronic device receives the second poll message, and dividing the first distance measurement cycle included in the first poll message by the calculated difference between the times.

The processor may be configured to calculate the response time, based on a first transmission offset included in the first poll message or the response message.

The processor may be configured to calculate the response time, based on at least one of a slot number for transmitting the response message, an offset number used to transmit the response message, or a time of one subslot.

The response message may further include a confidence level of the response time.

The processor may be configured to determine a contention phase or a transmission offset, broadcast the first poll message including the contention phase or the transmission offset by using the at least one communication module, receive at least one response message from the at least one external electronic device through the at least one communication module in response to the first poll message, and change the contention phase or the transmission offset, based on the at least one response message.

The processor may be configured to change a time corresponding to the contention phase, based on a number of the at least one response message, and the time corresponding to the contention phase may be configured to be shorter than a time of a cycle in which a distance is measured through designated communication.

The processor may be configured to determine the distance to the at least one external electronic device or the second distance measurement cycle, based on the first response message, receive at least one second response message including a response time to which a time error is applied from the at least one external electronic device, and determine the distance to the at least one external electronic device, based on the response time included in the second response message.

The processor may be configured to determine whether a time corresponding to the contention phase expires, and operate in a sleep state with respect to designated communication when the time corresponding to the contention phase expires.

The sleep state may be deactivating the first communication, and the processor may be configured to determine whether a time for performing the designated communication expires while operating in the sleep state with respect to the designated communication, and activate the designated communication when the time for performing the designated communication expires.

The transmission offset may include at least one of a number of transmission offsets, a transmission offset number, or reception offset configuration information.

The transmission offset number may be an offset number used for the electronic device to transmit the second poll message including the changed contention phase or the changed transmission offset.

The reception offset configuration information may be information for configuring whether the at least one external electronic device receiving the second poll message uses an offset number the same as the transmission offset number or randomly uses an offset number different from the transmission offset number when transmitting a response message to the second poll message.

An electronic device (e.g., the electronic device 101 of FIG. 1) according to various embodiments may include at least one communication module (e.g., the communication module 190 of FIG. 1), a memory (e.g., the memory 130 of FIG. 1), and a processor (e.g., the processor 120 of FIG. 1) operatively connected to the at least one communication module and the memory, wherein the processor may be configured to receive a first poll message including a first distance measurement cycle from an external electronic device by using the at least one communication module, receive a second poll message including a second distance measurement cycle by using the at least one communication module, calculate a time error and a response time, based on the first poll message or the second poll message, and transmit a response message including the response time to which the time error is applied to the external electronic device through the at least one communication module.

The processor may be configured to calculate the time error by calculating a difference between a time when the first poll message is received and a time when the second poll message is received, and dividing the first distance measurement cycle by the calculated difference between the times.

The processor may be configured to calculate the response time, based on a first transmission offset included in the first poll message or the response message.

The processor may be configured to operate in a sleep state with respect to designated communication when transmitting the response message.

The sleep state may be deactivating the designated communication, and the processor may be configured to determine whether a time for performing the designated communication expires, and activate the designated communication when the time for performing the designated communication expires.

Figure 4:
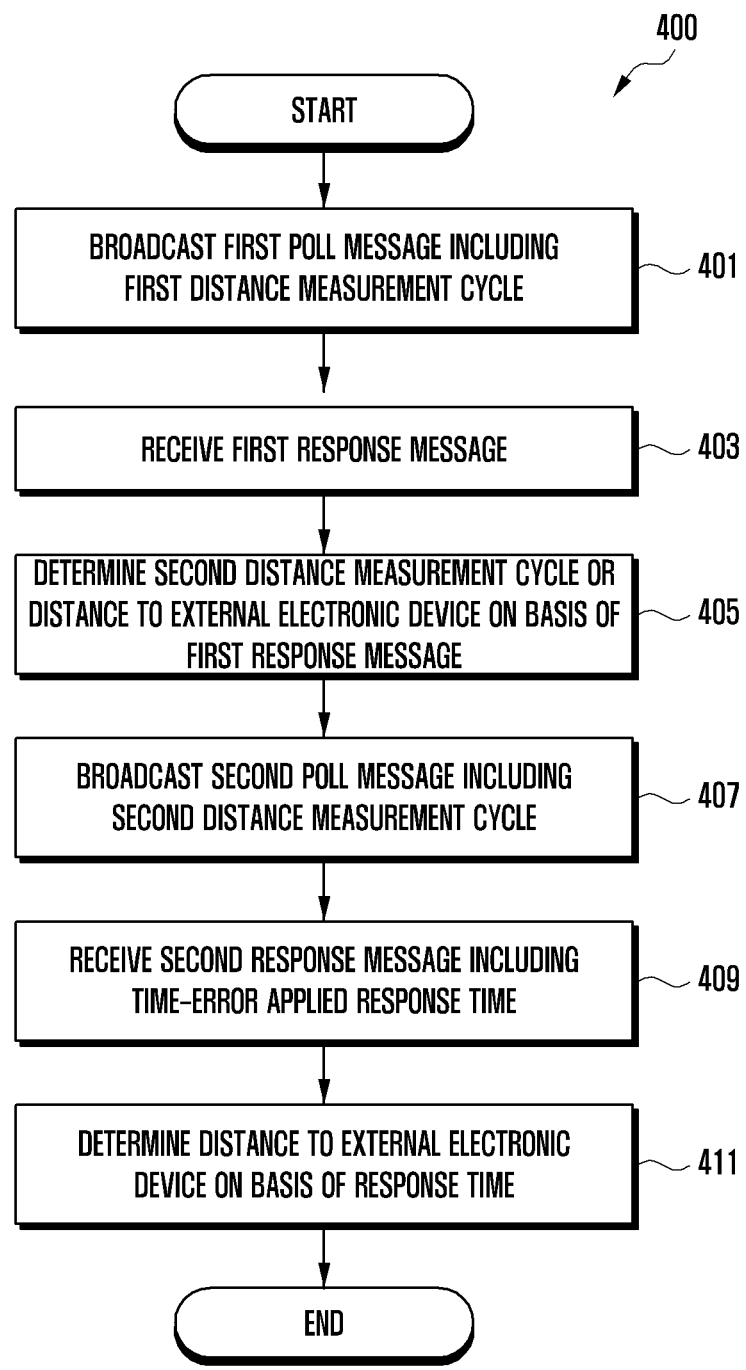
FIG. 4 is a flowchart illustrating an operating method of an electronic device serving as a master according to an embodiment of the disclosure.

FIG. 4 is a flowchart 400 illustrating an operating method of an electronic device serving as a master according to an embodiment of the disclosure.

Referring to FIG. 4, for understanding of the disclosure, when the electronic device (e.g., the electronic device 101 of FIG. 1) according to various embodiments serves as the master (e.g., an initiator or a node), an external electronic device (e.g., the external electronic device 102 or the external electronic device 104 of FIG. 1) may be described as operating as an electronic device (e.g., a responder) serving as a slave. Although the number of external electronic devices may be one or more than one, FIG. 4 shows that there is one external electronic device. However, the disclosure is not limited by this description.

In operation 401, a processor (e.g., the processor 120 of FIG. 1) of the electronic device 101 may broadcast a first poll message including a first distance measurement cycle. The processor 120 may broadcast the first poll message through a designated communication. The designated communication may refer to ultra-wideband (UWB) communication, and the UWB communication may be for measuring a distance (or position) of each electronic device by a method of two-way ranging (TWR) between the electronic device 101 and the external electronic device 102. The TWR method may include a single-sided TWR (SS-TWR) method or a double-sided TWR (DS-TWR) method. SS-TWR may be a method for measuring a distance between electronic devices by exchanging a poll message (or a poll frame) and a response message (or a response frame) therebetween. The poll message may be transmitted in the form of a packet.

In SS-TWR, the electronic device 101 may measure (or calculate) a distance to the external electronic device by using a difference between a time when a poll message is transmitted and a time when a response message is received from the external electronic device. To measure the distance, the electronic device 101 serving as the master may broadcast the poll message, and the external electronic device serving as the slave may transmit the response message. The poll message and the response message are transmitted in one slot, and slots may be grouped to configure a distance measurement cycle (e.g., an interval). When a plurality of external electronic devices transmits the response message, a collision between response messages may occur, and thus a time of one slot may be set to at least 1 ms to prevent the collision. When the distance measurement cycle is 100 ms, 100 slots (e.g., slot 0 to slot 99) are grouped to configure one distance measurement cycle. This example is provided only for understanding of the disclosure, and the disclosure is not limited by the description. Although the disclosure shows that the distance measurement cycle is 100 ms for illustration, the distance measurement cycle may be changeable. For example, the distance measurement cycle may be changeable based on a service type of an application requesting distance measurement and/or the number of external electronic devices.

During the UWB communication, the processor 120 of the electronic device 101 is unable to know a state of the external electronic device, and may thus have difficulty in scheduling which external electronic device uses which slot to transmit a response message. For example, the state of the external electronic device may include at least one of the number of external electronic devices existing adjacent to the electronic device 101, whether the external electronic device supports the UWB communication, whether the external electronic device is currently capable of the UWB communication, or whether a user of the external electronic device has stopped the UWB communication. The processor 120 is unable to know the state of the external electronic device, and may thus measure the distance, based on contention. The processor 120 needs to activate (or turn on) a RX module of a UWB module (e.g., the UWB module 220 of FIG. 2) during the distance measurement cycle (e.g., 100 ms), but when the RX module of the UWB module 220 is continuously activated, current consumption of the electronic device 101 may be large. Alternatively, the processor 120 may control activation of the UWB module 220 by using a different communication, such as BLE.

According to various embodiments of the disclosure, the processor 120 may configure a time (or length) of a contention phase to be used for exchanging an actual message in the distance measurement cycle, based on a state of communication with the external electronic device. The time of the contention phase may be shorter than that of the distance measurement cycle. The time of the contention phase may be included in a poll message transmitted from the electronic device 101 to the external electronic device. For example, the processor 120 may dynamically adjust the time of the contention phase according to the number of external electronic devices. For example, when the processor 120 transmits the first poll message, the processor 120 is unable to know the state of the external electronic device, and may thus configure a time of a first contention phase included in the first poll message to a default value. For example, the default value of the time of the first contention phase may be configured by the electronic device 101 or a user of the electronic device 101. For example, the default value of the time of the first contention phase may be 30 ms (e.g., slot 0 to slot 30). This example is provided only for understanding of the disclosure, and does not limit the disclosure. Since operation 401 is for transmitting the first poll message related to the UWB communication, the time of the first contention phase may be configured to the default value.

According to various embodiments of the disclosure, a message (e.g., a poll message or a response message) transmission period varies depending on an amount of information included in a message, but may be shorter than a time of one slot. A transmission offset may refer to a difference between a slot start time (e.g., slot 0) and a time (e.g., slot 2) at which an actual message (e.g., a poll message or a response message) is transmitted. The electronic device 101 and the external electronic devices may transmit messages at different times within a slot, thereby reducing interference compared to when always transmitting messages at the slot start time. Rather than arbitrarily configuring the transmission offset, dividing one slot into subslots may reduce a probability of a collision between messages (e.g., response messages).

The message transmission period may be configured according to a parameter related to security or communication quality of the UWB communication or a payload length (or amount) included in the message (e.g., the poll message or the response message). The parameter may include preamble symbol repetitions (PSR), a start frame delimiter (SFD), a scrambled timestamp sequence (STS), or a data rate. The parameter may be configured in advance in the electronic device 101, or may be configured between the electronic device 101 and the external electronic device through Bluetooth Low Energy (BLE) before the UWB communication starts. The configured parameter may not be changed while performing the UWB communication, and a maximum payload length to be used in the distance measurement cycle may be predictable by the electronic device 101.

According to various embodiments of the disclosure, the processor 120 may configure the number of transmission offsets, based on the payload length included in the message. For example, when the PSR is 64 bytes, the SFD is 8 bytes, the STS is 64 bytes, the data rate is 6.8 Mb/s, and the payload length is 30 bytes, the message transmission period may be about 190 us. In this case, the processor 120 may configure the number of transmission offsets to 5 or less. Since the time of one slot is 1 ms, when the time of one slot is divided by 5 (one slot/the number of transmission offsets), a time of one subslot may be 200 us. Since the parameter for the UWB communication is not changed, the processor 120 may configure the number of transmission offsets, based on the payload length included in the message.

Since the first poll message is a message that is first broadcast, the processor 120 may transmit the first poll message in a first slot (e.g., slot 0). The processor 120 may include the first distance measurement cycle corresponding to a next distance measurement cycle in the first poll message. A distance measurement cycle (e.g., an interval) refers to an interval at which the electronic device 101 transmits a poll message, and may refer to, for example, a time from transmission of a first poll message (e.g., the first poll message) to transmission of a second poll message (e.g., a second poll message). The first distance measurement cycle may refer to a scheduled time interval at which the second poll message is transmitted.

The processor 120 may determine the first distance measurement cycle, based on a first transmission offset. The first transmission offset may refer to an offset value to be used when transmitting a next poll message (e.g., the second poll message) and a response message to the second poll message. The first transmission offset may include at least one of the number of first transmission offsets, a first transmission offset number, and first reception offset configuration information. For example, the first transmission offset number may be a transmission offset number to be used when the electronic device 101 transmits the second poll message, and the first reception offset configuration information may indicate an offset number to be used when the external electronic device transmits the response message to the second poll message.

The first reception offset configuration information may include whether the external electronic device uses the same offset number as the first transmission offset number or uses a randomly different offset number when transmitting the response message to the second poll message. For example, when the first reception offset configuration information (e.g., a value of a specific bit (e.g., bit 7) of the first transmission offset) is a specified condition (e.g., 0), the external electronic device may use the same offset number as the first transmission offset number when transmitting the response message to the second poll message. When the first reception offset configuration information is not the specified condition (e.g., 1), when the external electronic device may use a random offset number within the number of first transmission offsets when transmitting the response message to the second poll message. When one slot is divided into subslots and used, the number of slots (e.g., 100) included in the distance measurement cycle may be increased by 100*the number of transmission offsets to a total slot number (e.g., 500), thus reducing a probability of a collision between messages transmitted by the plurality of external electronic devices within the same ranging area network (RAN).

According to various embodiments of the disclosure, the processor 120 may configure the first reception offset configuration information of the first transmission offset included in the first poll message to 0, and may configure second reception offset configuration information of a second transmission offset included in the second poll message to 0 or 1. The external electronic device that first receives the first poll message is unable to know an offset number in a previous poll message, and may thus calculate a transmission offset number used by the electronic device 101 by using the first distance measurement cycle and the first transmission offset included in the first poll message. The external electronic device may transmit a first response message to the first poll message by using the same offset number as the transmission offset number used by the electronic device 101 having transmitted the first poll message. The external electronic device receiving the second poll message (e.g., the second poll message) may configure an offset number, based on the first reception offset configuration information (e.g., 0 or 1) of the first transmission offset included in the first poll message, and may transmit a second response message to the second poll message by using the configured offset number.

According to an embodiment of the disclosure, since operation 401 is for transmitting the first poll message, the processor 120 may configure the first reception offset configuration information of the first transmission offset to 0. Further, in operation 401, the processor 120 may configure the number of first transmission offsets or the first transmission offset number included in the first transmission offset to a default value. The default value of the number of first transmission offsets or the first transmission offset number may be configured by the electronic device 101 or the user. Alternatively, in operation 401, the processor 120 may configure the number of first transmission offsets to 0, and may configure the first transmission offset number to the default value.

According to various embodiments of the disclosure, the first poll message may be transmitted in a broadcast manner. For example, the first poll message may include at least one of a protocol type, a service type, a frame (or message) type, a contention phase, a distance measurement cycle (or interval), a transmission offset, and a response control. The first poll message will be described with reference to FIG. 5A. Since the first poll message is broadcast, at least one external electronic device that exists adjacent to the electronic device 101 and has activated UWB communication may receive the first poll message.

According to various embodiments of the disclosure, when the electronic device 101 includes a plurality of UWB antennas (e.g., the first UWB antenna 221 and/or the second UWB antenna 223 of FIG. 2), the electronic device 101 may select an antenna for distance measurement, based on the state of the electronic device 101. For example, when the electronic device 101 includes a foldable and/or rollable display (e.g., the display module 160 of FIG. 1), the state of the electronic device 101 may include a state (e.g., a folded state, a rolled state, and/or an unfolded state) of the display. In another example, when the electronic device 101 includes a sensor module (e.g., the sensor module 176 of FIG. 1) capable of determining a position of a physical contact, the state of the electronic device 101 may be based on the position of the physical contact. In still another example, when a sensor module (e.g., the sensor module 176 of FIG. 1) capable of determining a rotational orientation of the electronic device 101 is included, the state of the electronic device 101 may be based on the orientation (e.g., portrait or landscape) of the electronic device 101.

In operation 403, the processor 120 may receive the first response message from the external electronic device. The first response message may refer to a response message first received from the external electronic device. For example, the first response message may be a response message to the first poll message transmitted by the electronic device 101, and may be transmitted in a unicast manner from the external electronic device to the electronic device 101 having transmitted the first poll message. For example, the first response message may include at least one of a protocol type, a service type, a frame (or message) type, response time information, and additional response information. The response time information may include time information about when the external electronic device receives the first poll message and time information about when the external electronic device transmits the first response message. Alternatively, the response time information may include information about a processing time required for the external electronic device to receive the first poll message and transmit the first response message. The additional response information may include an azimuth or an elevation for calculating angle of arrival (AOA) information. The first response message will be described with reference to FIG. 8.

In operation 405, the processor 120 may determine at least one of a second distance measurement cycle or the distance to the external electronic device, based on the first response message. After transmitting the first poll message, the processor 120 may activate the RX module of the UWB module 220 and may wait to receive the response message during the first contention phase. When receiving the first response message, the processor 120 may calculate the distance to the external electronic device or angle of arrival (AOA) information, and may transmit the same to an application (e.g., the application 370 of FIG. 3). The application 370 may display a user interface including an identifier (e.g., an icon) of the external electronic device on the display (e.g., the display module 160 of FIG. 1), based on the distance to the external electronic device or the AOA information. The processor 120 may calculate the distance to the external electronic device, based on the response time information included in the first response message. The processor 120 may calculate the AOA information, based on first response time information or first additional response information included in the first response message. To calculate the AOA information, the processor 120 may receive the first response message through the plurality of antennas. The processor 120 may calculate the AOA information, based on at least one of a distance difference or a phase difference based on a difference in arrival times of response messages received respectively through the plurality of antennas.

According to various embodiments of the disclosure, when the time of the first contention phase expires (e.g., 30 ms), the processor 120 may control the UWB communication to enter a sleep state until the next poll message (e.g., the second poll message) is transmitted. When the time of the first contention phase expires, the processor 120 may control the UWB communication to enter the sleep state for a remaining time of the first distance measurement cycle. For example, when the first distance measurement cycle included in the first poll message is 100 and the time of the first contention phase is 30 ms, the remaining time of the first distance measurement cycle may be a time of the first distance measurement cycle minus the time of the first contention phase (e.g., 100 ms−30 ms=70 ms). When the remaining time of the first distance measurement cycle has elapsed, the processor 120 may transmit the second poll message, and may activate the UWB communication (e.g., activate the RX module of the UWB module 220) to receive the second response message to the second poll message.

According to various embodiments of the disclosure, when transmitting the second poll message, the processor 120 may dynamically adjust the time of the contention phase according to the number of external electronic devices transmitting a response message (e.g., the first response message). The number of external electronic devices may be calculated as the number of response messages received during the first contention phase time (e.g., the time corresponding to the contention phase included in the first poll message). The processor 120 may increase or decrease the time of the contention phase by a predetermined unit (e.g., 3, 5, or 10) according to the number of response messages. The processor 120 may determine success of reception or failure of reception by interpreting the response message. For example, the failure of reception may include occurrence of an error in decoding (or parsing) the response message. The processor 120 may determine that a collision between response messages has occurred, based on the failure of reception. The processor 120 may calculate the number of response messages by including at least one of the number of response messages successfully received, the number of response messages having failed to be received, or the number of response messages increased by the number of response messages having failed to be received.

For example, when the number of successfully received response messages is 2 and the number of received unsuccessful response messages is 1, the processor 120 may calculate the number (e.g., 4) of final response messages, based on "the number (e.g., 2) of successfully received response messages+the number (e.g., 1) of response messages having failed to be received+the number (e.g., 1) of response messages as many as the number of response messages having failed to be received." In another example, when the number of successfully received response messages is 2 and the number of received unsuccessful response messages is 2, the processor 120 may calculate the number (e.g., 6) of final response messages, based on "the number (e.g., 2) of successfully received response messages+the number (e.g., 2) of response messages having failed to be received+the number (e.g., 2) of response messages as many as the number of response messages having failed to be received."

The processor 120 may determine a time of a second contention phase, based on the number of response messages received during the time of the first contention phase. The processor 120 may increase or decrease the time of the second contention phase, based on the number of response messages. A criterion for increasing or decreasing the time of the contention phase may be predefined by the electronic device 101 or the user. According to various embodiments of the disclosure, when increasing the time of the second contention phase, the processor 120 may reflect the increased time of the second contention phase when transmitting the second poll message. When decreasing the time of the contention phase, if the time of the contention phase is determined to be decreased consecutively a predetermined number of times (e.g., three times, five times, or ten times), the processor 120 may reflect the decreased time of the contention phase when transmitting a poll message (e.g., a fourth poll message) after the predetermined number of times. When decreasing the time of the contention phase, the processor 120 may sequentially decrease the time of the contention phase step by step.

According to various embodiments of the disclosure, when transmitting the second poll message, the processor 120 may determine the second transmission offset, based on a length of a payload included in the first response message or the second poll message. The processor 120 may determine the number of transmission offsets, based on the length of the payload included in the second poll message, may configure a value of a specific bit of the second transmission offset to 0 or 1, and may determine a second transmission offset number. The processor 120 may determine the second contention phase (e.g., the time of the second contention phase) or the second transmission offset to be included in the second poll message in operation 407. The processor 120 may determine a second distance measurement cycle, based on the second transmission offset. The second transmission offset may refer to an offset value to be used when transmitting a next poll message (e.g., a third poll message) and a response message to the third poll message.

In operation 407, the processor 120 may broadcast the second poll message including the second distance measurement cycle. The second distance measurement cycle may refer to a time from when transmitting the second poll message to when transmitting the third poll message. The processor 120 may determine the second distance measurement cycle, based on the second transmission offset. The second transmission offset may include at least one of the number of second transmission offsets, the second transmission offset number, and second reception offset configuration information. For example, the second transmission offset number may be a transmission offset number to be used when the electronic device 101 transmits the third poll message, and the second reception offset configuration information may indicate an offset number to be used when the external electronic device transmits the response message to the third poll message. Since operation 407 is the same as or similar to operation 401, a detailed description thereof may be omitted.

In operation 409, the processor 120 may receive the second response message including a response time to which a time error is applied from the external device. The second response message may refer to a response message received second from the external device. Response time information included in the second response message may have the time error applied thereto. The time error may increase as the response time increases. Since the electronic device 101 and the external electronic device may not temporally match (or may not be temporally synchronized), the time error may occur in the response time information. When the time error occurs between the electronic device 101 and the external electronic device, accuracy of the distance to the external electronic device measured by the electronic device 101 may decrease. To overcome this disadvantage, the external electronic device may transmit the second response message by applying the time error to the response time.

The time error may be calculated based on the first distance measurement cycle and a time difference between poll messages. For example, the time difference between the poll messages may refer to a difference between a time when the external electronic device receives the first poll message and a time when the external electronic device receives the second poll message. The external electronic device may divide the first distance measurement cycle by the time difference between the poll messages. The external electronic device may calculate the response time, based on the first transmission offset included in the first poll message and/or the second response message. For example, the external electronic device may calculate the response time by using at least one of a slot number for transmitting the second response message, an offset number used for transmitting the second response message (e.g., a reception offset number), and one subslot time.

According to various embodiments of the disclosure, a different external electronic device that has received the second poll message but has not received the first poll message is unable to calculate the time difference between the poll messages, and may thus not apply a time error to a response time. According to another embodiment of the disclosure, the different external electronic device that has not received the first poll message may calculate a difference between a time when the first poll message is transmitted and a time when the second poll message is received, based on the second distance measurement cycle and the second transmission offset included in the second poll message. According to another embodiment of the disclosure, the different external electronic device that has not received the first poll message may use a general distance measurement cycle of 100 ms as the time difference between the poll messages. The external electronic device may transmit the additional response information by including whether the time error is reflected in the response time information included in the second response message therein.

According to various embodiments of the disclosure, the additional response information may further include a confidence level of the response time. Regarding the confidence level of the response time, the external electronic device may or may not include the confidence level in the response time according to a request from the electronic device 101 that has transmitted the poll message. When the confidence level of the response time is requested via the response control included in the poll message, the external electronic device may transmit the response message by including the confidence level in the additional response information. Since the external electronic device that has received both the first poll message and the second poll message may calculate the time error, the confidence level of the response time may be high. The different external electronic device that has received the second poll message but has not received the first poll message may calculate the time error but may calculate the time difference between the poll messages, based on the second poll message, and thus the confidence level of the response time may be low.

In operation 411, the processor 120 may determine the distance to the external electronic device, based on the response time. The processor 120 may determine whether the response time information included in the second response message reflects the time error. When the time error is reflected in the response time, the processor 120 may determine the distance to the external electronic device, based on the response time. In another embodiment of the disclosure, when the time error is reflected in the response time and the confidence level of the response time exceeds a configured threshold value, the processor 120 may determine the distance to the external electronic device, based on the response time. In another embodiment of the disclosure, when the time error is not reflected in the response time, the processor 120 may determine the distance to the external electronic device, based on a time when the second poll message is transmitted and a time when the second response time is received. In another embodiment of the disclosure, when the time error is reflected in the response time and the confidence level of the response time is less than or equal to the configured threshold value, the processor 120 may determine the distance to the external electronic device, based on the time when the second poll message is transmitted and the time when the second response time is received.

Figure 5A:
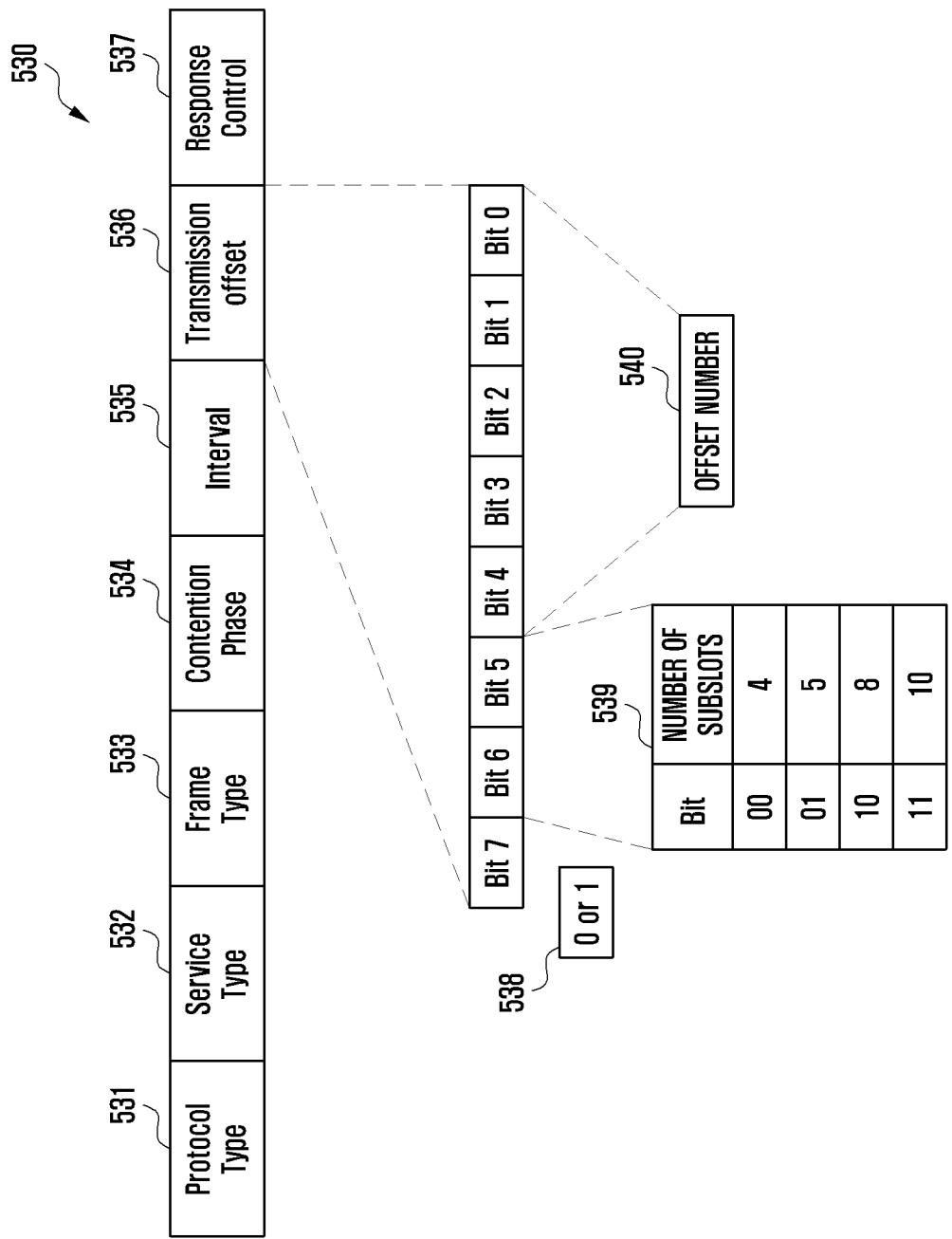
FIG. 5A illustrates a format of a poll message according to an embodiment of the disclosure.

FIG. 5A illustrates a format of a poll message according to an embodiment of the disclosure.

Referring to FIG. 5A, the poll message 530 may include at least one of a protocol type 531, a service type 532, a frame type 533, a contention phase 534, an interval 535, a transmission offset 536, or a response control 537. In addition, the poll message 530 may further include a payload. The protocol type 531 may include information about a communication protocol used for UWB communication.

The service type 532 may include information about an application performed through the UWB communication. The frame type 533 may include information indicating a format of a message. For example, in the SS-TWR method, the frame type 533 may indicate at least one of a poll message or a response message. In another example, in the DS-TWR method, the frame type 533 may indicate at least one of a poll message, a response message, or a final message.

According to various embodiments of the disclosure, the contention phase 534 indicates a time of a contention phase, and may include information about a time (e.g., 30 ms) actually used in a distance measurement cycle. For example, the contention phase 534 may include information about a time for the electronic device 101 to activate RX of the UWB module 220 in order to transmit a poll message and receive a response message from at least one external device. The interval 535 refers to an interval at which the electronic device 101 transmits a poll message, and may be a scheduled time interval (e.g., 100 ms) at which a next poll message is transmitted. For example, the interval 535 refers to a time from when transmitting a first poll message to when transmitting a second poll message, and may change according to at least one of a transmission offset number used to transmit the first poll message, the number of transmission offsets included in the transmission offset 536, or a transmission offset number.

According to various embodiments of the disclosure, the protocol type 531, the service type 532, the frame type 533, the contention phase 534, the transmission offset 536, or the response control 537 may have a capacity of 1 byte or a capacity of less or greater than 1 byte. The interval 535 may have a capacity of 3 bytes or a capacity of less or greater than 3 bytes. This example is only for understanding of the disclosure, and does not limit details of the disclosure.

The transmission offset 536 may refer to an offset value to be used when transmitting the next poll message and a response message to the next poll message. The transmission offset 536 may include at least one of the number of transmission offsets, the transmission offset number, and reception offset configuration information. The transmission offset 536 may be represented by 1 byte, and a value of bit 7 538 may indicate the reception offset configuration information. The reception offset configuration information may include whether a transmission offset number (e.g., an offset number to be used when the electronic device 101 transmits the next poll message) and a reception offset number (e.g., an offset number to be used when the external electronic device transmits a response message to the next poll message) are the same or are different. When the transmission offset number and the reception offset number that are the same are used, the value of bit 7 538 may be 0, and when the transmission offset number and the reception offset number that are different are used, the value of bit 7 538 may be 1, or vice versa.

A value of bit 5 and bit 6 539 of the transmission offset 536 may indicate the number of transmission offsets (e.g., the number of subslots). The number of transmission offsets may indicate the number of subslots to be used when the external electronic device transmits the response message to the next poll message. For example, when the value of bit 5 and bit 6 539 is 00, the number of transmission offsets is 4, when the value of bit 5 and bit 6 539 is 01, the number of transmission offsets is 5, when the value of bit 5 and bit 6 539 is 10, the number of transmission offsets is 8, and when the value of bit 5 and bit 6 539 is 11, the number of transmission offsets may be 10. The number of transmission offsets according to the value of bit 5 and bit 6 539 may be configured by the electronic device 101 or the user of the electronic device 101. This example is only for understanding of the disclosure, and does not limit details of the disclosure. A value of bits 0 to 4 540 of the transmission offset 536 may indicate an offset number to be used when the electronic device 101 transmits the next poll message. The transmission offset number may indicate an offset number to be used when the electronic device 101 transmits the next poll message.

According to various embodiments of the disclosure, the processor 120 may transmit a poll message including the interval 535 of 100.4 ms and the transmission offset 536 (e.g., 00100010) in which the value of bit 7 538 is configured to 0, the value of bit 5 and bit 6 539 is configured to 01, and the value of bits 0 to 4 540 is configured to 3. In this case, an external electronic device first receiving the poll message may calculate a transmission offset number used when the electronic device 101 transmits the poll message, based on the interval 535 and the value of bit 5 and bit 6 539 included in the transmission offset 536. The external electronic device first receiving the poll message may transmit a response message to the poll message by using the same offset number as the calculated transmission offset number. For example, when transmitting a response message (e.g., a second response message) to a next poll message (e.g., a second poll message), the external electronic device first receiving the poll message (e.g., a first poll message) may transmit the response message, based on the transmission offset 536. For example, when transmitting the response message to the next poll message, the external electronic device first receiving the poll message may transmit the response message by using a third offset the same as a transmission offset number (e.g., a third offset) within the number (e.g., 5) of transmission offsets.

An external electronic device not first receiving the poll message and having received a previous poll message may transmit a response message by using a transmission offset included in the previous poll message. When transmitting a response message to a next poll message, the external electronic device not first receiving the poll message and having received the previous poll message may transmit the response message by using a third offset the same as a transmission offset number (e.g., a third offset) within the number (e.g., 5) of transmission offsets.

In an embodiment of the disclosure, the processor 120 may transmit a poll message including the interval 535 of 100.4 ms and the transmission offset 536 (e.g., 11000001) in which the value of bit 7 538 is configured to 1, the value of bit 5 and bit 6 539 is configured to 10, and the value of bits 0 to 4 540 is configured to 2. In this case, an external electronic device first receiving the poll message may calculate a transmission offset number used when the electronic device 101 transmits the poll message, based on the interval 535 and the value of bit 5 and bit 6 539 included in the transmission offset 536. The external electronic device first receiving the poll message may transmit a response message by using the same offset number as the calculated transmission offset number. For example, when transmitting a response message to a next poll message (e.g., a second poll message), the external electronic device first receiving the poll message (e.g., a first poll message) may transmit the response message, based on the transmission offset 536. For example, when transmitting the response message to the next poll message, the external electronic device first receiving the poll message may transmit the response message by using a random offset number (e.g., a third offset) different from a transmission offset number (e.g., a second offset) within the number (e.g., 5) of transmission offsets.

An external electronic device not first receiving the poll message and having received a previous poll message may transmit a response message by using a transmission offset included in the previous poll message. For example, when transmitting a response message to a next poll message, the external electronic device not first receiving the poll message and having received the previous poll message may transmit the response message by using a random offset number (e.g., a fourth offset) different from a transmission offset number (e.g., a second offset) within the number (e.g., 5) of transmission offsets.

The response control 537 may include additionally requested information in addition to information (e.g., response time information) for measuring a distance to an external electronic device. For example, the response control 537 is necessary for the electronic device 101 to measure AOA information with respect to the external electronic device, and may include additional information measured by the external electronic device. The response control 537 may include at least one of azimuth information, elevation information, peak signal-to-noise ratio (SNR) path information, first SNR path information, information about a difference between the peak and the first, index information about a first path, whether reserved for future use (RFU) is requested, or whether a confidence level of a response time is requested.

The azimuth information may include an azimuth of the electronic device 101 measured by the external electronic device or a figure of merit (FoM) of the azimuth measured by the external electronic device. The elevation information may include an elevation of the electronic device 101 measured by the external electronic device or a FoM of the elevation measured by the external electronic device. The azimuth or the elevation is always requested by the electronic device 101, and the FoMs of the azimuth and the elevation may be selectively requested. The peak SNR path information may indicate a time (or index) at which a signal-to-noise ratio is maximum, and the first SNR path information may indicate a time of a first transmitted message (e.g., a poll message).

The response control 537 may be represented by 1 byte, and bit 7 to bit 0 may sequentially include the azimuth information, the elevation information, the peak signal-to-noise ratio (SNR) path information, the first SNR path information, the information about the difference between the peak and the first, the index information about the first path, whether RFU is requested, or whether the confidence level of the response time is requested. When the electronic device 101 requests the additional information of the external electronic device, a value of a bit included in the response control 537 may be configured to 1, and the electronic device 101 does not request the additional information of the external electronic device, the value of the bit included in the response control 537 may be configured to 0.

FIG. 5B illustrates a notation table of a message according to an embodiment of the disclosure.

Referring to FIG. 5B, in the notation table 550 of the message, a binary number may be expressed as a hexadecimal number. For example, when expressing 1-byte data, the processor 120 may express eight bits in binary (e.g., 0000 0000 to 1111 1111) or in hexadecimal (e.g., 0x00 to 0xFF). Referring to the notation table 550 of the message, a transmission offset 536 with a value of bit 7 538 configured to 0, a value of bit 5 and bit 6 bit 539 configured to 00, and a value of bits 0 to 4 540 configured to 3 may be expressed as 0000 0010 in binary and 0x02 in hexadecimal. Alternatively, referring to the notation table 550 of the message, a transmission offset 536 with a value of bit 7 538 configured to 1, a value of bit 5 and bit 6 bit 539 configured to 00, and a value of bits 0 to 4 540 configured to 2 may be expressed as 1000 0001 in binary and 0x81 in hexadecimal.

Figure 6A:
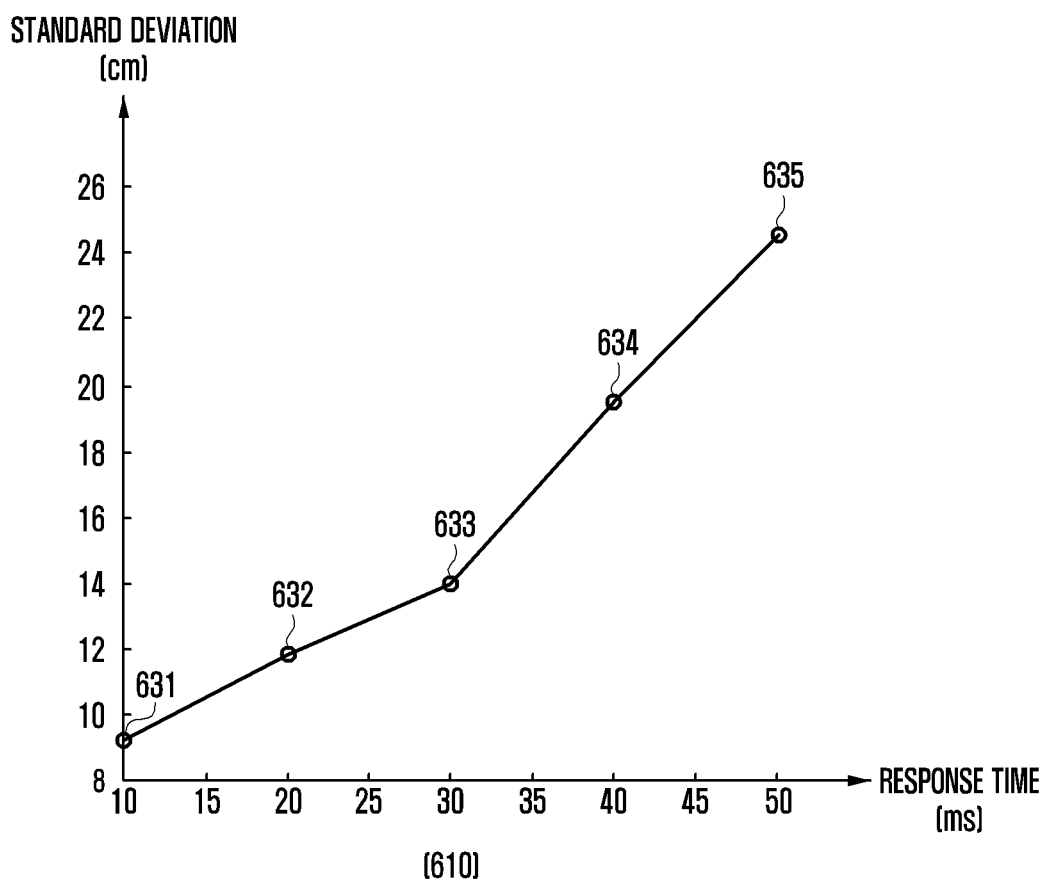
FIG. 6A is a graph illustrating an error range of a response time according to an embodiment of the disclosure.

FIG. 6A is a graph illustrating an error range of a response time according to an embodiment of the disclosure.

Referring to FIG. 6A, a first graph 610 represents a standard deviation according to a response time received by an electronic device (e.g., the electronic device 101 of FIG. 1) from a plurality of external electronic devices according to various embodiments. For example, a first response time 631 may refer to a response time received from a first external electronic device, a second response time 632 may refer to a response time received from a second external electronic device, a third response time 633 may refer to a response time received from a third external electronic device, a fourth response time 634 may refer to a response time received from a fourth external electronic device, and a fifth response time 635 may refer to a response time received from a fifth external electronic device.

The first external electronic device to the fifth external electronic device may be located at substantially the same distance from the electronic device 101. When the first external electronic device to the fifth external electronic device transmit response messages in an order of the first external electronic device to the fifth external electronic device, accuracy of a distance to an external electronic device transmitting a response message late (e.g., the fourth external electronic device and the fifth external electronic device) may be low. Transmitting a response message late may mean a long response time. The response time may be a time from reception of a poll message from the electronic device 101 to transmission of a response message to the electronic device 101.

Referring to the first graph 610, a standard deviation according to the first response time 631 may be 9, a standard deviation according to the second response time 632 is may be 12, a standard deviation according to the third response time 633 may be 14, a standard deviation according to the fourth response time 634 may be 20, and a standard deviation according to the fifth response time 635 may be 24. Referring to the first graph 610, a standard deviation is higher as a response time increases. Although the first external electronic device and the second external electronic device are at substantially the same distance from the electronic device 101, the standard deviations may be significantly different according to a difference in response time. For example, when the electronic device 101 measures a distance to an external device, based on a response time, a great error occurs in measuring a distance to an external electronic device that has transmitted a response message late, accuracy of the distance is low.

FIG. 6B illustrates a time error table by response time according to a comparative example according to an embodiment of the disclosure.

Referring to FIG. 6B, a time error table 650 according to the comparative example may include an average distance to an external electronic device, a standard error range, and minimum and maximum distances to the external electronic device by response time. For example, the average distance (e.g., 77.65) between the electronic device 101 and the external electronic device when the response time is 10 ms may be shorter than the average distance (e.g., 77.91) between the electronic device 101 and the external electronic device when the response time is 40 ms. In another example, when the response time is 20 ms, a difference (e.g., 2.05) between the minimum distance (e.g., 77.33) and the maximum distance (e.g., 79.38) between the electronic device 101 and the external electronic device may be large. In another example, when the response time is 50 ms, the difference (e.g., 1.72) between the minimum distance (e.g., 77.09) and the maximum distance (e.g., 78.81) between the electronic device 101 and the external electronic device may be large. Referring to a standard error by response time, as the response time increases, the error range increases when measuring the distance to the external electronic device.

FIG. 6C illustrates a time error table by response time according to an embodiment of the disclosure.

Referring to FIG. 6C, a time error table 670 in which a time error is applied to a response time may include an average distance to an external electronic device, a standard error range, and minimum and maximum distances to the external electronic device by response time. To increase accuracy of distance measurement or reduce an error in distance measurement, the external electronic device may transmit a response message by applying a time error to a response time. For example, the average distance between the electronic device 101 and the external electronic device by response time ranges from 77.60 m to 77.71 m, which shows that there is little difference in the average distance even through the response time increases. In addition, the minimum distance between the electronic device 101 and the external electronic device according to the response time is 77.28 m, and the maximum distance therebetween is 77.89 m, which shows that there is little difference between the minimum distance and the maximum even through the response time increases. Referring to a standard error by response time, even though the response time increases, the error range is not large when measuring the distance to the external electronic device.

Comparing the time error table 670 of FIG. 6C in which the time error is applied to the response time with the time error table 650 according to the comparative example of FIG. 6B, even though the response time increases, the electronic device may measure the distance to the external electronic device, based on the response time to which the time error is applied, thus reducing an error in distance measurement. According to various embodiments of the disclosure, the electronic device may apply the time error to the response time when measuring the distance to the external electronic device, thereby increasing accuracy. For example, when the response time and the time error are taken into account, the average distance, the standard error, and/or the difference between the minimum distance and the maximum distance may be reduced.

Figure 7:
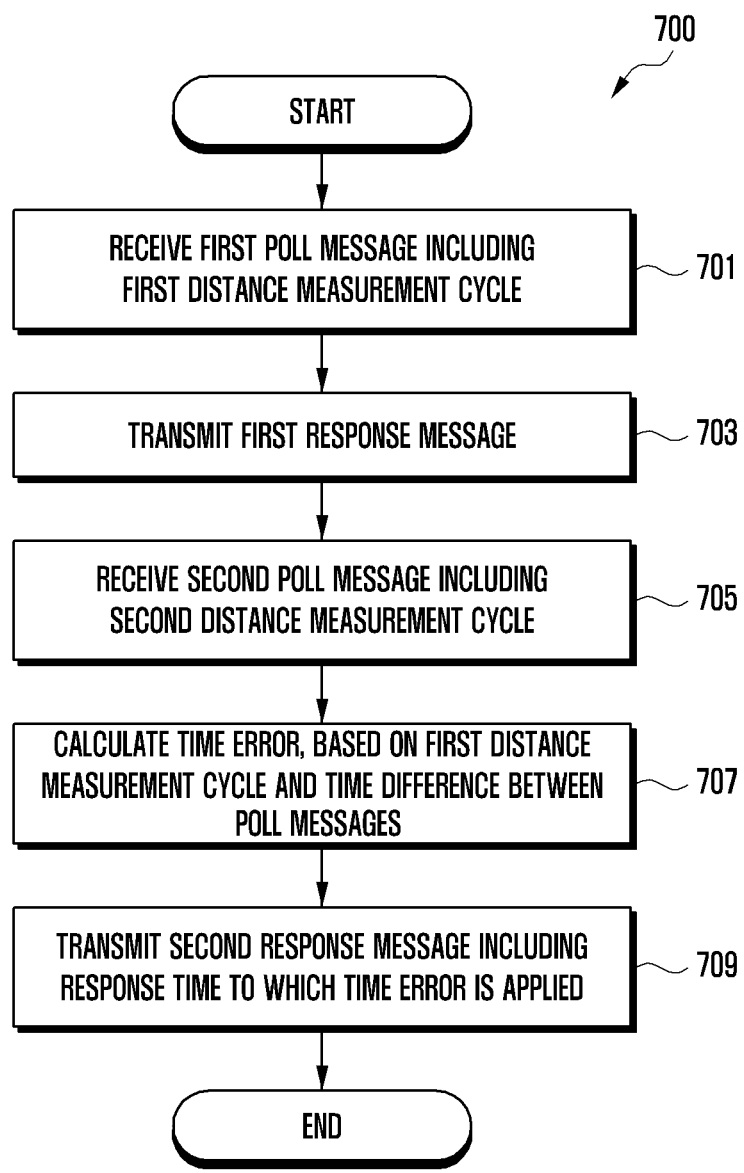
FIG. 7 is a flowchart illustrating an operating method of an electronic device serving as a slave according to an embodiment of the disclosure.

FIG. 7 is a flowchart 700 illustrating an operating method of an electronic device serving as a slave according to an embodiment of the disclosure.

Referring to FIG. 7, for understanding of the disclosure, when the electronic device (e.g., the electronic device 101 of FIG. 1) according to various embodiments serves as the slave, an external electronic device (e.g., the external electronic device 102 or the external electronic device 104 of FIG. 1) may be described as operating as an electronic device serving as a master.

In operation 701, a processor 120 of the electronic device 101 may receive a first poll message including a first distance measurement cycle from the external electronic device through a UWB module 220. The first poll message may include at least one of a protocol type, a service type, a frame (or message) type, a contention phase (e.g., a first contention phase), a distance measurement cycle (e.g., the first distance measurement cycle), a transmission offset (e.g., a first transmission offset), or response control. The first contention phase may be a time (e.g., 10 ms, 15 ms, 30 ms, or 50 ms) required to exchange an actual message in the first distance measurement cycle. The contention phase may be configured to a time shorter than the distance measurement cycle. For example, when the distance measurement cycle is 100 ms, the contention phase may be configured to up to 50 ms. The distance measurement cycle is illustratively described as 100 ms, but may be changed. For example, the distance measurement cycle may be changeable based on a service type of an application requesting distance measurement and/or the number of external electronic devices. For example, the first transmission offset may refer to an offset value to be used when transmitting a next poll message (e.g., a second poll message) and a response message to the second poll message. The first transmission offset may include at least one of the number of first transmission offsets, a first transmission offset number, and first reception offset configuration information. The first contention phase or the first transmission offset has been described with reference to FIG. 4, and thus a detailed description thereof may be omitted.

In operation 703, the processor 120 may transmit a first response message to the external electronic device through the UWB communication module 220. In an embodiment of the disclosure, the processor 120 may transmit the first response message within the time of the first contention phase. For example, the processor 120 may transmit the response message within a time (e.g., 30 ms) corresponding to the first contention phase in the distance measurement cycle (e.g., 100 ms, the interval 535). The processor 120 may calculate a transmission offset number used when the external electronic device transmits the first poll message, based on the first distance measurement cycle and the first transmission offset included in the first poll message. When first receiving the first poll message, the processor 120 may transmit the first response message by using the same offset number as the transmission offset number used when the external electronic device transmits the first poll message. The processor 120 may calculate the transmission offset number used when the external electronic device transmits the first poll message, and may transmit the first response message to the first poll message by using the same offset number as the calculated transmission offset number. The processor 120 may calculate the transmission offset number used when the external electronic device transmits the first poll message, based on the first distance measurement cycle and the number of subslots included in the first transmission offset.

For example, when the external electronic device transmits the first poll message including a first distance measurement cycle of 100.4 ms, a number of first transmission offsets of 5, and a first transmission offset number of 2, the processor 120 may calculate one subslot as 200 um from the number of first transmission offsets. When one subslot is 0.2 ms (e.g., 200 um), the first distance measurement cycle is 100.4 ms, and the first transmission offset number is 2, the processor 120 may calculate that the transmission offset number used when the external electronic device transmits the first message is 0. The distance measurement cycle may be increased or decreased by a time of one subslot (e.g., 0.2 ms). When the transmission offset number is 1, the distance measurement cycle may be increased by a time of one subslot (e.g., 0.2 ms), and when the transmission offset number is 2, the distance measurement cycle may be increased by a time of two subslots (e.g., 0.4 ms). The distance measurement cycle is an interval at which a poll message is transmitted, and may thus be determined based on the transmission offset number used when the external electronic device transmits the first poll message and the transmission offset number included in the first poll message. When the transmission offset number used when the external electronic device transmits the first poll message is 2, and the transmission offset number included in the first poll message is 2, the poll message is transmitted via the same offset number, and thus the distance measurement cycle may be 100 ms. When the transmission offset number used when the external electronic device transmits the first poll message is 2, and the transmission offset number included in the first poll message is 1, the transmission offset number is reduced by 1 in one distance measurement cycle, and thus the distance measurement cycle may be 99.8 ms.

The processor 120 may transmit the first response message by including response time information or additional response information therein. The response time information may include time information about when the electronic device 101 receives the first poll message (e.g., the first poll message received in operation 701) from the external electronic device and time information about when the electronic device 101 transmits the first response message (e.g., the first response message transmitted in operation 703). Alternatively, the response time information may include information about a processing time required for the electronic device 101 to receive the first poll message and transmit the first response message.

According to various embodiments of the disclosure, the processor 120 may apply a time error to the response time information. The time error may mean that the electronic device 101 and the external electronic device do not temporally match. When a time error occurs between the electronic device 101 and the external electronic device, a time error may occur in the response time information. When the time error occurs between the electronic device 101 and the external electronic device, accuracy of a distance to the external electronic device measured by the electronic device 101 may decrease. To overcome this disadvantage, the processor 120 may transmit the first response message by applying the time error to the response time.

The time error may be calculated based on the first distance measurement cycle and a time difference between poll messages. For example, the time difference between the poll messages may refer to a difference between a time when the electronic device 101 receives the first poll message and a time when the electronic device 101 receives the second poll message. The processor 120 may divide the first distance measurement cycle by the time difference between the poll messages. The processor 120 may calculate the response time, based on the first transmission offset included in the first poll message or a second response message. For example, the processor 120 may calculate the response time by using at least one of a slot number for transmitting the second response message, an offset number used for transmitting the second response message (e.g., a reception offset number), and one subslot time.

According to various embodiments of the disclosure, when the first poll message is a poll message first received, the processor 120 is unable to calculate the time difference between the poll messages, and may thus not apply the time error the response time. For example, the time difference between the poll messages refers to a time difference between two poll messages, and may be obtained only when two or more poll messages are received. Alternatively, the processor 120 may calculate the time difference between the poll messages, based on the first distance measurement cycle and the first transmission offset included in the first poll message. Alternatively, the processor 120 may use a general distance measurement cycle of 100 ms as the time difference between the poll messages. The processor 120 may transmit the additional response information by including whether the time error is reflected in the response time information included in the first response message therein.

The additional response information may include an azimuth of the external electronic device measured by the electronic device 101 or an elevation of the external electronic device measured by the electronic device 101. For example, the additional response information may be information required for the external electronic device to calculate AOA information about the electronic device 101. According to various embodiments of the disclosure, the processor 120 may selectively include a FoM of the azimuth or a FoM of the elevation in the response message according to a request from the external electronic device having transmitted the poll message.

According to various embodiments of the disclosure, the additional response information may further include a confidence level of the response time. The confidence level of the response time may or may not be included in the response time according to a request of the external device having transmitted the poll message. When the confidence level of the response time is requested in the response control included in the poll message, the electronic device 101 may transmit the response message to the external electronic device by including the confidence level in the additional response information. When at least two poll messages are consecutively received, the processor 120 may calculate a time error, thus including a high confidence level (e.g., high) in the response time. Alternatively, when at least two poll messages are not consecutively received, the processor 120 is unable to calculate a time error or may calculate a time error, which is predicted, thus including a low confidence level (e.g., low) in the response time. Since only one poll message is received in operation 703, the processor 120 may include a low confidence level (e.g., low) in the response time included in the first response message.

In operation 705, the processor 120 may receive a second poll message including a second distance measurement cycle from the external electronic device through the UWB communication module 220. The second distance measurement cycle may refer to a time from when transmitting the second poll message to when transmitting a third poll message. The second poll message may include at least one of a protocol type, a service type, a frame (or message) type, a contention phase (e.g., a second contention phase), a distance measurement cycle (e.g., the second distance measurement cycle), and a transmission offset (e.g., a second transmission offset), or response control. Operation 705 is the same as or similar to operation 701, and thus a detailed description thereof may be omitted.

In operation 707, the processor 120 may calculate the time error, based on the first distance measurement cycle and the time difference between the poll messages. The first distance measurement cycle may be included in the first poll message received in operation 701, and the time difference between the poll messages may refer to the difference between the time when the electronic device 101 receives the first poll message and the time when the electronic device 101 receives the second poll message. The processor 120 may divide the first distance measurement cycle by the time difference between the poll messages. For example, when the first distance measurement cycle is 100.4 ms and the time difference between the poll messages is 100 ms, the time error may be calculated by 100.4 ms/100 ms=1.004.

In operation 709, the processor 120 may apply the time error to the response time, and may transmit the second response message including the response time to which the time error is applied. The processor 120 may calculate the response time, based on the first transmission offset included in the first poll message or the second response message. For example, the processor 120 may calculate the response time by using at least one of a slot number for transmitting the second response message, an offset number (e.g., a reception offset number) used when transmitting the second response message, or a time of one subslot. The first transmission offset may include at least one of the number of first transmission offsets, the first transmission offset number, and the first reception offset configuration information. The first reception offset configuration information may include whether the first transmission offset number (e.g., an offset number used when the external electronic device transmits the first poll message) and a reception offset number (e.g., an offset number to be used when the electronic device 101 transmits the second response message) are the same or are different.

For example, when the number of first transmission offsets is 10, one slot may be divided into 10 subslots. Since a time of one slot is 1 ms, when one slot is divided into 10 subslots, a time of one subslot may be 0.1 ms (e.g., 1 ms/10). The processor 120 may determine that the reception offset number is 2, based on the first reception offset configuration information, and that the second response message is transmitted through a seventh slot (e.g., slot 7). The processor 120 may calculate the response time by multiplying the slot number (e.g., 7) for transmitting the second response message by the time of one slot (e.g., 1 ms) and adding the time of one subslot (e.g., 0.1 ms) (e.g., 7 ms+0.1 ms). The processor 120 may apply (e.g., multiply) the time error (e.g., 1.004) to the response time (e.g., 7.1 ms). The processor 120 may include the response time to which the time error is applied, which is 1.004*7.1 ms=7.1284 ms, as the response time information.

The processor 120 may transmit the response additional information by including whether the time error is reflected in the response time information included in the second response message therein. The additional response information may further include the confidence level of the response time. Since the processor 120 may calculate the time error by receiving the first poll message and the second poll message, a high confidence level (e.g., high) may be included in the response time included in the second response message.

Figure 8:
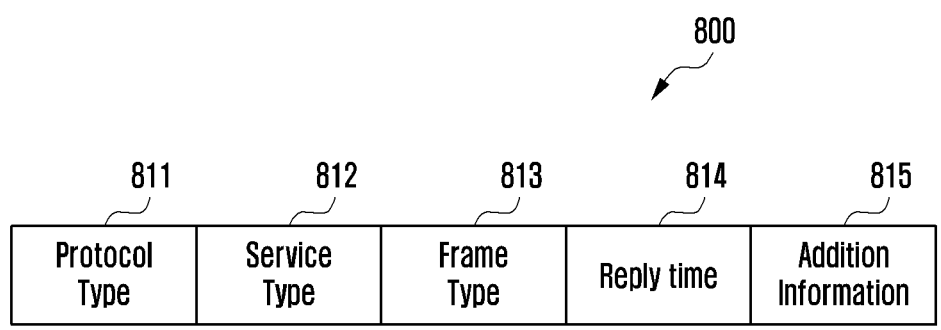
FIG. 8 illustrates a format of a response message according to an embodiment of the disclosure.

FIG. 8 illustrates a format of a response message according to an embodiment of the disclosure.

Referring to FIG. 8, a response message 800 may include at least one of a protocol type 811, a service type 812, a frame type 813, response time information (reply time) 814, or additional response information 815. In addition, the response message 800 may further include a payload. The protocol type 811 may include information about a communication protocol used for UWB communication. The service type 812 may include information about an application performed through the UWB communication. The frame type 813 indicates a message format, and may include information indicating at least one of a poll message and a response message. The frame type 813 may indicate at least one of a poll message and a response message. The protocol type 811 or the service type 812 of the response message 800 may be the same as the protocol type 531 or the service type 532 of the poll message 530. The frame type 813 of the response message 800 may indicate a response message.

According to various embodiments of the disclosure, the response time information 814 may include time information about when the electronic device 101 receives the poll message (e.g., the first message received in operation 601) from the external electronic device and time information about when the electronic device 101 transmits the response message (e.g., the second message transmitted in operation 603). Alternatively, the response time information may include information about a processing time required for the electronic device 101 to receive the poll message and transmit the response message. A time error between the electronic device 101 and the external electronic device may be applied to the response time information 814. In an embodiment of the disclosure, the additional response information 815 may include an azimuth of the external electronic device measured by the electronic device 101 or an elevation of the external electronic device measured by the electronic device 101. In an embodiment of the disclosure, the additional response information may include a confidence level of the response time information 814.

In an embodiment of the disclosure, the additional response information 815 may be information required for the external electronic device to calculate AOA information about the electronic device 101. For example, the additional response information 815 may include at least one of an azimuth, a FoM of the azimuth, an elevation, a FoM of the elevation, peak SNR path information, first SNR path information, information about a difference between the peak and the first, index information about a first path, or a confidence level of a response time. According to various embodiments of the disclosure, the processor 120 may selectively include the FoM of the azimuth or the FoM of the elevation in the response message according to a request from the external electronic device transmitting the poll message.

According to various embodiments of the disclosure, the protocol type 811, the service type 812, the frame type 813, or the additional response information 815 may have a capacity of 1 byte or a capacity of less or greater than 1 byte. The response time information 814 may have a capacity of 4 bytes or a capacity of less or greater than 4 bytes.

Figure 9:
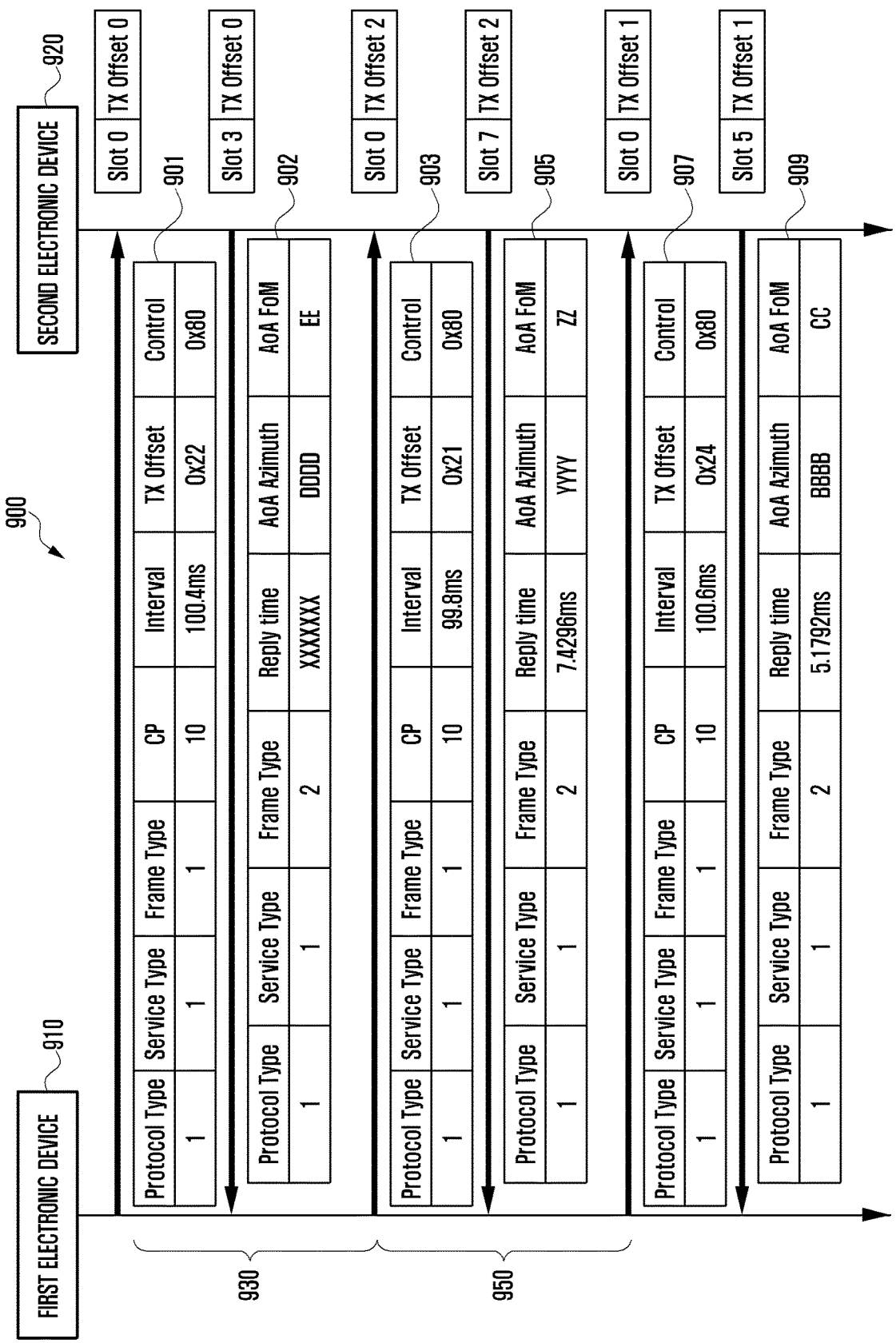
FIG. 9 is a flowchart illustrating an operating method between electronic devices according to an embodiment of the disclosure.

FIG. 9 is a flowchart 900 illustrating an operating method between electronic devices according to an embodiment of the disclosure.

Referring to FIG. 9, in operation 901, a first electronic device 910 (e.g., the electronic device 101 of FIG. 1) may start UWB communication, and may broadcast a first poll message including a first distance measurement cycle 930. The UWB communication may be for measuring a distance (or position) of each electronic device by a method of two-way ranging (TWR) between the first electronic device 910 and a second electronic device 920 (e.g., the external electronic device 102 of FIG. 1). The first electronic device 910 may start the UWB communication after performing a preparation process for starting UWB communication with the second electronic device 920. The preparation process may include an operation of identifying whether the second electronic device 920 is capable of UWB communication or a state of the second electronic device 920 by using BLE communication.

The first poll message may be transmitted to one or more electronic devices located adjacent to the first electronic device 910 in a broadcast manner. The first poll message may refer to a poll message transmitted first after starting the UWB communication. The first poll message may include at least one of a first protocol type (e.g., 1), a first service type (e.g., 1), a first frame type (e.g., 1), a first contention phase (e.g., 10 ms), a first distance measurement cycle 930 (or interval) (e.g., 100.4 ms), a first transmission offset (e.g., 0x22), or first response control (e.g., 0x80). Operation 901 may be the same as or similar to operation 401 of FIG. 4.

According to various embodiments of the disclosure, referring to the message notation table 550 illustrated in FIG. 5B, the first transmission offset may be expressed in hexadecimal. When the first transmission offset is 0x22, bit 7 to bit 0 may be expressed as 0010 0010 in binary. Referring to the transmission offset of FIG. 5A, first reception offset configuration information may be 0, a first transmission offset number may be 2, and the number of the first transmission offsets may be 5. When the number of the first transmission offsets is 5, one slot may be divided into five subslots. For example, one distance measurement cycle may include 100 slots, and a time of one slot may be 1 ms. When one slot is divided into five subslots, the first distance measurement cycle may include a total of 500 subslots. Since the first contention phase is 10 ms, the first electronic device 910 may receive a response message within 50 subslots in the first distance measurement cycle. Since the first poll message is a message first transmitted by the first electronic device 910, the first electronic device 910 may transmit the transmission offset number as 0 (e.g., Tx Offset 0) in slot 0 (e.g., a first subslot among the 50 subslots) (e.g., slot 0).

The first transmission offset may be information that is not used for the second electronic device 920 to transmit a first response message to the first poll message but is used to transmit a response message (e.g., a second response message) to a second poll message to be subsequently transmitted. The first electronic device 910 may transmit the first poll message, and may enter a sleep state after a lapse of 10 ms (e.g., the first contention phase). The first distance measurement cycle 930 may be a time (or time interval) from transmission of the first poll message to transmission of the second poll message. The first electronic device 910 may enter the sleep state after a lapse of the first contention phase (e.g., 10 ms) during the first distance measurement cycle 930.

According to various embodiments of the disclosure, the first electronic device 910 may equally or differently request a value to be included in a response message from at least one external electronic device (e.g., the second electronic device 920) by using the first response control. The first electronic device 910 may require post processing to perform accurate distance measurement and to obtain AoA information, and may require additional information to perform distance measurement and to calculate AoA information. However, all values may not always be required, and always transmitting all values may increase a message length, current consumption, and a probability of a collision, and may deteriorate reception performance. The first electronic device 910 may request only essential information to measure distance and to calculate AoA information. When the first response control is 0x80, bit 7 to bit 0 may be expressed as 1100 0000 in binary. The first response control being 0x80 may mean that the first electronic device 910 requests transmission of a response message including azimuth information and elevation information in response to the first poll message.

The second electronic device 920 may start UWB communication before operation 901. In operation 902, the second electronic device 920 may transmit the first response message to the first electronic device 910. The first response message may refer to a response message transmitted first to the first electronic device 910 in response to the first poll message. The first response message may include a first protocol type (e.g., 1), a first service type (e.g., 1), a first frame type (e.g., 1), first response time information (e.g., a reply time), or first additional response information (AoA azimuth and AoA FoM). The first protocol type, the first service type, or the first frame type included in the first response message may be the same as a second protocol type (e.g., 1), a second service type (e.g., 1), or a second frame type (e.g., 1) included in the second poll message. The response time information may include time information about when the second electronic device 920 receives the first poll message and time information about when the second electronic device 920 transmits the first response message. Alternatively, the response time information may include information about a processing time required for the second electronic device 920 to receive the first poll message and transmit the first response message. The first additional response information is requested via the first response control included in the first poll message, and since the first response control is 0x80, the second electronic device 920 may transmit the first response message including azimuth information (AoA azimuth) or a FoM of the azimuth information (AoA FoM).

According to various embodiments of the disclosure, since the first poll message is a poll message first received, the second electronic device 920 may not apply a time error to the response time information when transmitting the first response message. To apply the time error, at least two poll messages need to be received, and thus the second electronic device 920 may not apply the time error to the response time information when transmitting the first response message.

In operation 903, the first electronic device 910 may broadcast the second poll message. When the first distance measurement cycle 930 (e.g., 100.4 ms) expires, the first electronic device 910 may wake up from the sleep state, may broadcast the second poll message, and may activate a RX module of a UWB module 220 to receive the response message to the second poll message. For example, the first electronic device 910 may activate the RX module at a time of broadcasting the second poll message. The second poll message is a poll message transmitted after the first electronic device 910 transmits the first poll message, and may refer to a poll message transmitted second after starting the UWB communication. The second poll message may include at least one of the second protocol type (e.g., 1), the second service type (e.g., 1), the second frame type (e.g., 1), a second contention phase (e.g., 10 ms), a second distance measurement cycle (e.g., 99.8 ms), a second transmission offset (e.g., 0x21), or second response control (e.g., 0x80). The second distance measurement cycle (e.g., 99.8 ms) may be different according to the number of second transmission offsets. When the second transmission offset is 0x21, bit 7 to bit 0 may be expressed as 0010 0001 in binary. Referring to the transmission offset of FIG. 5A, second reception offset configuration information may be 0, a second transmission offset number may be 1, and the number of the second transmission offsets may be 5.

The first electronic device 910 may determine the second contention phase, based on the received response message to the first poll message. The first electronic device 910 may calculate the number of response messages received during a time of the first contention phase (e.g., the first contention phase). The first electronic device 910 may increase or decrease the time of the contention phase by a predetermined unit (e.g., 3, 5, or 10) according to the number of response messages. A method for adjusting the time of the contention phase has been described with reference to FIG. 4, and thus a description thereof may be omitted. The first electronic device 910 may transmit the second transmission offset number as 2 (e.g., Tx Offset 2) in slot 0 (e.g., the first subslot among the 50 subslots) (e.g., slot 0).

In operation 905, the second electronic device 920 may transmit the second response message to the first electronic device 910. The second response message may refer to a response message transmitted second to the first electronic device 910 in response to the second poll message. The second response message may include a second protocol type (e.g., 1), a second service type (e.g., 1), a second frame type (e.g., 1), second response time information (e.g., a reply time), or second 2 additional response information (AoA azimuth and AoA FoM). The second protocol type, the second service type, or the second frame type included in the second response message may be the same as the second protocol type (e.g., 1), the second service type (e.g., 1), and the second frame type (e.g., 1) included in the second poll message. The response time information may include time information about when the second electronic device 920 receives the second poll message and time information about when the second electronic device 920 transmits the second response message. Alternatively, the response time information may include information about a processing time required for the second electronic device 920 to receive the second poll message and transmit the second response message. The second additional response information is requested via the second response control included in the second poll message, and since the second response control is 0x80, the second electronic device 920 may transmit the second response message including azimuth information (AoA azimuth) or a FoM of the azimuth information (AoA FoM).

According to various embodiments of the disclosure, when transmitting the second response message, the second electronic device 920 may apply a time error to the response time information. The time error may occur because the first electronic device 910 and the second electronic device 920 are not temporally synchronized. When the time error occurs between the first electronic device 910 and the second electronic device 920, accuracy of the distance to the second electronic device 920 measured by the first electronic device 910 may decrease. To overcome this disadvantage, the second electronic device 920 may apply the time error to the second response time information.

The time error may be obtained by dividing the second distance measurement cycle by a time difference between poll messages (e.g., the first poll message and the second poll message). For example, the time difference between the poll messages may mean a difference between a time when the second electronic device 920 receives the first poll message and a time when the second electronic device 920 receives the second poll message. When the first distance measurement cycle included in the first poll message is 100.4 ms and the difference between the time when the first poll message is received and the time when the second poll message is received is 100 ms, the second electronic device 920 may obtain the time error by 100.4 ms/100 ms=1.004.

The second electronic device 920 may calculate a response time, based on the first transmission offset included in the first poll message or the second response message. For example, since the first reception offset configuration information included in the first poll message is 0, the first transmission offset number is 2, and the number of first transmission offsets is 5, a time of one subslot may be 0.2 ms. For example, since the time of one slot is 1 ms, the time of one subslot may be 0.2 ms by dividing one slot time by 5 (one slot/the number of transmission offsets). Since the first reception offset configuration information is 0, the second electronic device 920 may transmit the response message with the same offset number (e.g., 2) as the first transmission offset number. When transmitting the response message with a reception offset number as 2 through a seventh slot, the second electronic device 920 may calculate the response time by multiplying a slot number (e.g., 7) by the time of one slot (e.g., 1 ms) and, because of the reception offset number being 2, adding a time of two subslots (e.g., 0.2 ms) (e.g., 7 ms+0.2 ms). The processor 120 may apply (e.g., multiply) the time error (e.g., 1.004) to the response time (e.g., 7.2 ms). The processor 120 may include the response time to which the time error is applied, which is 1.004*7.2 ms=7.2282 ms, as the response time information.

According to various embodiments of the disclosure, the second electronic device 920 may transmit the second response message by further including a confidence level of the response time information therein. The second electronic device 920 may include the confidence level of the response time information in the additional response information. After transmitting the second response message, the second electronic device 920 may enter the sleep state with respect to the UWB communication until the second distance measurement cycle included in the second poll message expires.

The first electronic device 910 may determine the distance to the second electronic device 920, based on the response time included in the second response message. The first electronic device 910 may determine the distance to the second electronic device 920, based on a time when the second poll message is transmitted, a time when the second response message is received, the response time (7.4296 ms), and a speed of light (C) (speed of light=about 3*108 m/s). For example, the distance may be obtained by (time when the second response message is received−time when the second poll message is transmitted−response time)*C/2.

In operation 907, the first electronic device 910 may broadcast a third poll message. The third poll message is a poll message transmitted after the second poll message is transmitted, and may refer to a poll message transmitted third after starting the UWB communication. The third poll message includes at least one of a third protocol type (e.g., 1), a third service type (e.g., 1), a third frame type (e.g., 1), a third contention phase (e.g., 10 ms), a third distance measurement cycle (e.g., 100.6 ms), a third transmission offset (e.g., 0x24), or third response control (e.g., 0x80). When the third transmission offset is 0x24, bit 7 to bit 0 may be expressed as 0010 0100 in binary. Referring to the transmission offset of FIG. 5A, third reception offset configuration information may be 0, a third transmission offset number may be 4, and the number of third transmission offsets may be 5.

The first electronic device 910 may determine the third contention phase, based on the response message received in response to the second poll message. The first electronic device 910 may calculate the number of response messages received during a time of the second contention phase (e.g., the second contention phase). The first electronic device 910 may increase or decrease the time of the contention phase by a predetermined unit (e.g., 3, 5, or 10) according to the number of response messages. The first electronic device 910 may transmit the third transmission offset number as 1 (e.g., Tx Offset 1) in slot 0.

In operation 909, the second electronic device 920 may transmit a third response message. When the second distance measurement cycle expires, the second electronic device 920 may wake up from the sleep state, and may activate a RX module of a UWB module 220 to receive the third poll message. The third response message may refer to a second response message transmitted to the first electronic device 910 in response to the third poll message. Since pieces of information included in the third response message are the same as or similar to those of the first response message, a detailed description thereof may be omitted. The second electronic device 920 may determine a slot or an offset number for transmitting the third response message, based on the second transmission offset (e.g., 0x21) included in the second poll message. Since the reception offset configuration information of the second transmission offset number is 0, the second electronic device 920 may transmit the third response message by using the same offset number (e.g., Tx Offset 1) as the transmission offset number transmitted by the first electronic device 910. Further, the second electronic device 920 may transmit the third response message in slot 5 among the 50 subslots (e.g., a sixth subslot among the 50 subslots) (e.g., slot 5).

According to various embodiments of the disclosure, when transmitting the second response message, the second electronic device 920 may apply a time error to the response time information. The time error may be obtained by dividing the second distance measurement cycle by a time difference between poll messages. For example, the time difference between the poll messages may refer to a difference between a time when the second electronic device 920 receives the second poll message and a time when the second electronic device 920 receives the third poll message. When the second distance measurement cycle is 99.8 ms and the difference between the time when the second poll message is received and the time when the third poll message is received is 100.2 ms, the second electronic device 920 may obtain the time error by 99.8 ms/100.2 ms=0.996.

The second electronic device 920 may calculate a response time, based on the second transmission offset included in the second poll message or the third response message. For example, since the second reception offset configuration information included in the second poll message is 0, the second transmission offset number is 1, and the number of second transmission offsets is 5, a time of one subslot may be 0.2 ms. Since the first reception offset configuration information is 0, the second electronic device 920 may transmit the response message with the same offset number (e.g., 1) as the first transmission offset number. When transmitting the response message with a reception offset number as 1 through a fifth slot, the second electronic device 920 may calculate the response time by multiplying a slot number (e.g., 5) by the time of one slot (e.g., 1 ms) and adding a time of one subslot (e.g., 0.2 ms) (e.g., 5 ms+0.2 ms). The processor 120 may apply (e.g., multiply) the time error (e.g., 0.996) to the response time (e.g., 5.2 ms). The processor 120 may include the response time to which the time error is applied, which is 0.996*5.2 ms=5.1792 ms, as response time information.

According to various embodiments of the disclosure, the second electronic device 920 may transmit the third response message by further including a confidence level of the response time information therein. The second electronic device 920 may include the confidence level of the response time information in additional response information. After transmitting the third response message, the second electronic device 920 may enter the sleep state with respect to the UWB communication until the third distance measurement cycle included in the third poll message expires.

The first electronic device 910 may determine the distance to the second electronic device 920, based on the response time included in the third response message. The first electronic device 910 may determine the distance to the second electronic device 920, based on a time when the third poll message is transmitted, a time when the third response message is received, the response time (5.1792 ms) included in the third response message, and the speed of light (C) (speed of light=about 3*108 m/s). For example, the distance may be obtained by (time when the third response message is received−time when the third poll message is transmitted−response time)*C/2.

Figure 10:
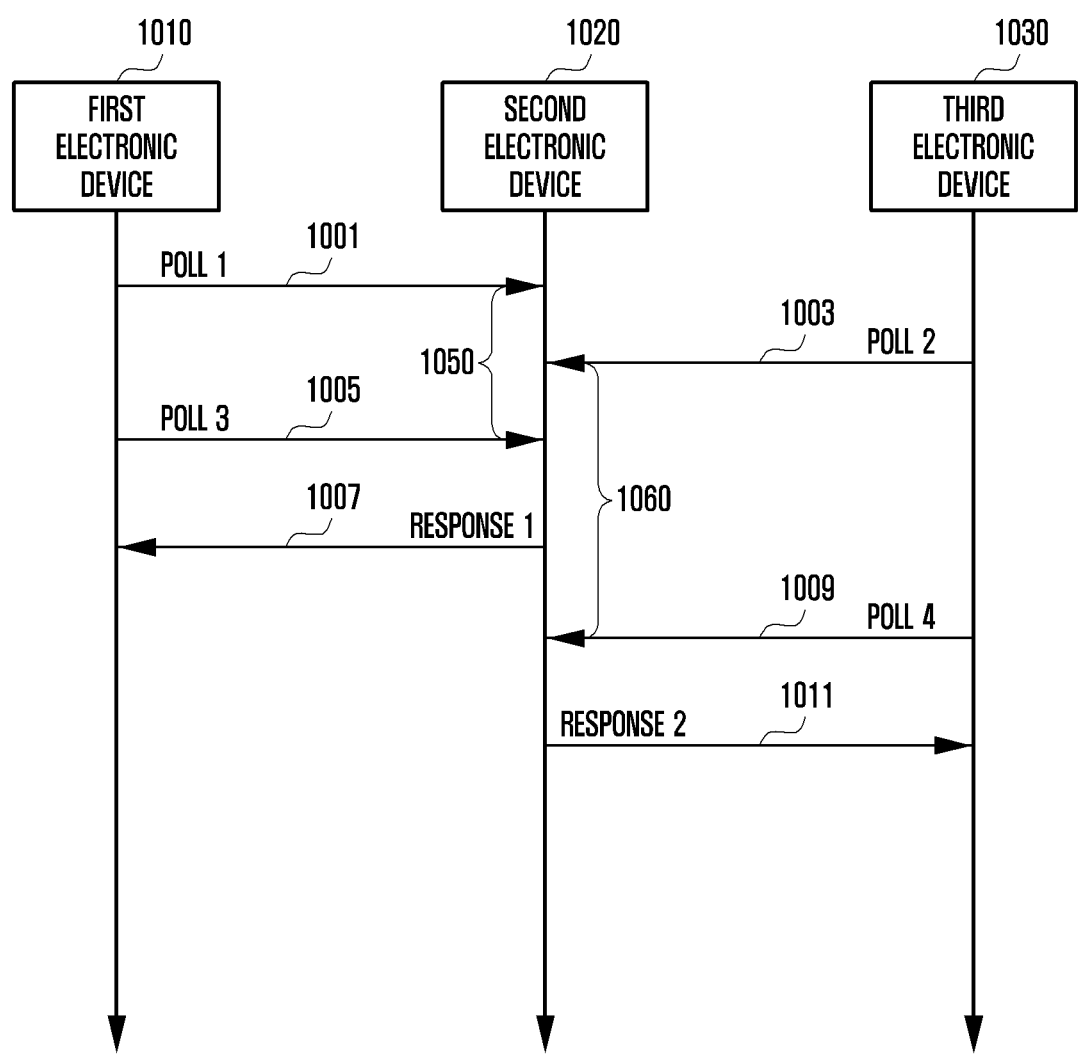
FIG. 10 is a flowchart illustrating an operating method between a plurality of electronic devices according to an embodiment of the disclosure.

FIG. 10 is a flowchart illustrating an operating method between a plurality of electronic devices according to an embodiment of the disclosure.

FIG. 10 illustrates an operation in which a first electronic device 1010, a second electronic device 1020, and a third electronic device 1030 perform UWB communication.

Referring to FIG. 10, in operation 1001, the first electronic device 1010 (e.g., the electronic device 101 of FIG. 1) may broadcast a first message (e.g., POLL 1) including a first distance measurement cycle 1050. For example, the first poll message (e.g., POLL 1) may include at least one of a protocol type, a service type, a frame (or message) type, a contention phase, a distance measurement cycle (or interval), a transmission offset, or response control. The first distance measurement cycle 1050 may be a time from when the first electronic device 1010 transmits the first poll message (e.g., POLL 1) to when the first electronic device 1010 transmits a second poll message (e.g., POLL 3). The first electronic device 1010 may determine a first distance measurement cycle 1040, based on a first transmission offset. The first transmission offset may refer to an offset value to be used when transmitting a next poll message (e.g., a second poll message, POLL 3) and a response message (e.g., RESPONSE 1) to the second poll message (POLL 3). The first poll message (e.g., POLL 1) and the first distance measurement cycle 1040 have been described with reference to the foregoing drawings, a detailed description thereof may be omitted.

In operation 1003, the third electronic device 1030 (e.g., the electronic device 104 of FIG. 1) may broadcast a first poll message (e.g., POLL 2) including a first distance measurement cycle 1060. The first distance measurement cycle 1060 may be a time from when the third electronic device 1030 transmits the first poll message (e.g., POLL 2) to when the third electronic device 1030 transmits a second poll message (e.g., POLL 4).

In operation 1005, the first electronic device 1010 may broadcast the second poll message (e.g., POLL 3) including a second distance measurement cycle. The first electronic device 1010 may determine the second distance measurement cycle, based on a second transmission offset.

In operation 1007, the second electronic device 1020 (e.g., the electronic device 102 of FIG. 1) may transmit a first response message (RESPONSE 1) to the first electronic device 1010. The first response message may refer to a first response message transmitted by the second electronic device 1020 to the first electronic device 1010. The first response message may be transmitted to the first electronic device 1010 in a unicast manner. For example, the first response message may include at least one of a protocol type, a service type, a frame (or message) type, response time information, and additional response information.

The response time information included in the first response message may have a time error applied thereto. The time error may occur because the first electronic device 1010 and the second electronic device 1020 are not temporally synchronized. The time error may be obtained by dividing the first distance measurement cycle 1050 by a time difference between poll messages (e.g., the first poll message (e.g., POLL 1) and the second poll message (e.g., POLL 3)). For example, the time difference between the poll messages may refer to a difference between a time when the second electronic device 1020 receives the first poll message (e.g., POLL 1) and a time when the second electronic device 1020 receives the second poll message (e.g., POLL 3). The second electronic device 1020 may transmit the first response message (e.g., RESPONSE 1) by applying the time error to the response time information. The first response message (e.g., RESPONSE 1) has been described with reference to the foregoing drawings, and thus a detailed description thereof may be omitted.

In operation 1009, the third electronic device 1030 may broadcast the second poll message (e.g., POLL 4) including a second distance measurement cycle 1060. The third electronic device 1030 may determine the second distance measurement cycle, based on a second transmission offset.

In operation 1011, the second electronic device 1020 may transmit a second response message (RESPONSE 2) to the third electronic device 1030. Response time information included in the second response message may have a time error applied thereto. The time error may occur because the second electronic device 1020 and the third electronic device 1030 are not temporally synchronized. The time error may be obtained by dividing the second distance measurement cycle 1060 by a time difference between poll messages (e.g., the first poll message (e.g., POLL 2) and the second poll message (e.g., POLL 4)). For example, the time difference between the poll messages may refer to a difference between a time when the second electronic device 1020 receives the first poll message (e.g., POLL 2) and a time when the second electronic device 1020 receives the second poll message (e.g., POLL 4). The second electronic device 1020 may transmit the second response message (e.g., RESPONSE 2) by applying the time error to the response time information. The second response message (e.g., RESPONSE 2) has been described with reference to the foregoing drawings, and thus a detailed description thereof may be omitted.

Figure 11:
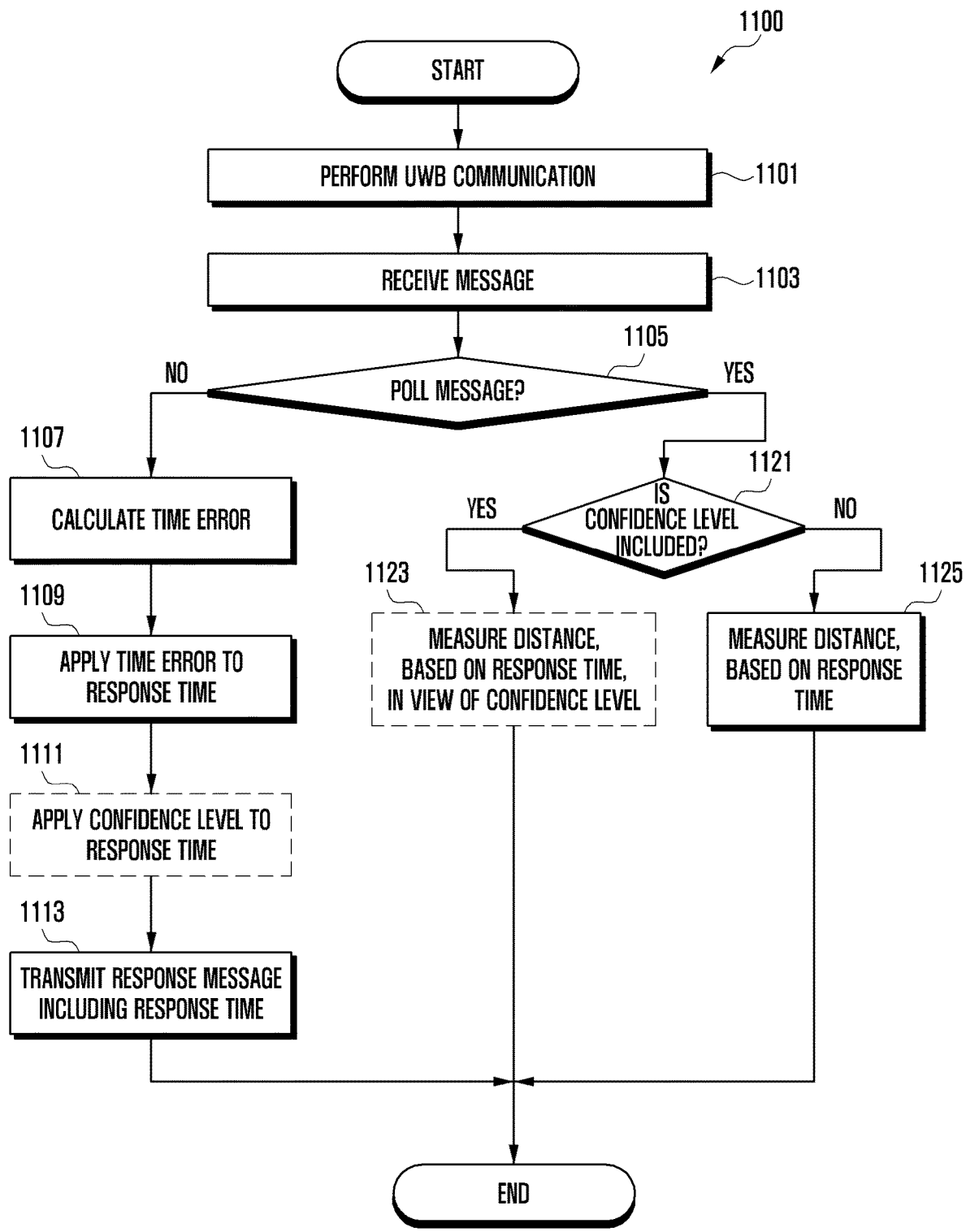
FIG. 11 is a flowchart illustrating an operating method of an electronic device according to an embodiment of the disclosure.

FIG. 11 is a flowchart 1100 illustrating an operating method of an electronic device according to an embodiment of the disclosure.

FIG. 11 illustrates an example in which the electronic device (e.g., the electronic device 101 of FIG. 1 or the second electronic device 1020 of FIG. 10) serves both as a master and as a slave according to various embodiments.

Referring to FIG. 11, in operation 1101, a processor (e.g., the processor 120 of FIG. 1) may perform UWB communication. For example, the UWB communication may be for measuring a distance (or position) of each electronic device by a method of TWR between the electronic device 101 and an external electronic device (e.g., the electronic device 102 of FIG. 1 and/or the electronic device 104). The processor 120 may transmit a poll message to external electronic devices and may receive a response message to the poll message, or may receive a poll message from external electronic devices and may transmit a response message to the poll message.

In operation 1103, the processor 120 may receive a message. For example, the message may include a poll message or a response message.

In operation 1105, the processor 120 may determine whether the received message is a poll message. For example, the processor 120 may determine whether the received message is a poll message or a response message by identifying a frame type (e.g., the frame type 533 or the frame type 813) of the received message. The processor 120 may perform operation 1107 when the received message is a poll message, and may perform operation 1121 when the received message is not a poll message (e.g., is a response message).

When the received message is a poll message, the processor 120 may calculate a time error in operation 1107. The time error may occur because an external electronic device transmitting the poll message and the electronic device transmitting a response message are not temporally synchronized. The processor 120 may obtain the time error by dividing a distance measurement cycle included in a previously received poll message by a time difference between poll messages.

In operation 1109, the processor 120 may apply the time error to a response time. The processor 120 may calculate the response time, based on a transmission offset included in the previously received poll message or the response message to be transmitted. A specific method for obtaining the response time has been described with reference to the foregoing drawings, and thus a detailed description thereof may be omitted.

In operation 1111, the processor 120 may apply a confidence level to the response time. The confidence level indicates a confidence level of the response time. When the time error is applied to the response time, the confidence level may be high, and when the time error is not applied to the response time, the confidence level may be low. According to various embodiments of the disclosure, the confidence level may or may not be included in the response time according to a request from the external electronic device transmitting the poll message. When the confidence level of the response time is requested via response control included in the poll message, the processor 120 may apply the confidence level to the response time. When the confidence level is not requested, operation 1111 may be omitted.

In operation 1113, the processor 120 may transmit the response message including the response time to the external electronic device that has transmitted the poll message.

In operation 1105, when the received message is a response message, in operation 1121, the processor 120 may determine whether a confidence level of a response time is included in the response message. The processor 120 may identify whether the confidence level of the response time is included in additional response information (e.g., the additional response information 815 of FIG. 8) included in the response message. The external electronic device may or may not include the confidence level of the response time in the response time according to a request from the electronic device 101 that has transmitted the poll message. The confidence level of the response time may be divided into high/low, high/middle/low, or more than three levels. When the confidence level of the response time is requested via response control included in a poll message, the external electronic device may transmit the response message by including the confidence level in the additional response information. Since the external electronic device that has received both a first poll message and a second poll message may calculate a time error, the confidence level of the response time may be high. Another external electronic device that has received the second poll message but has not received the first poll message may calculate a time error but may calculate a time difference between poll messages, based on the second poll message, and thus the confidence level of the response time may be low.

The processor 120 may perform operation 1123 when the additional response information includes the confidence level, and may perform operation 1125 when the additional response information does not include the confidence level.

When the confidence level is included in the additional response information, the processor 120 may measure a distance to the external electronic device in view of the confidence level in operation 1123. When the confidence level is included in the additional response information, the processor 120 may determine whether the confidence level of the response time exceeds a configured threshold value. For example, when the confidence level is low, the processor 120 may not perform an operation of measuring the distance to the external electronic device, based on the message. In another embodiment of the disclosure, when the confidence level of the response time exceeds the configured threshold value, the processor 120 may determine the distance to the external electronic device, based on the response time. In another embodiment of the disclosure, when the confidence level of the response time is less than or equal to the configured threshold value, the processor 120 may determine the distance to the external electronic device, based on a time when the poll message is transmitted and a time when the response message is received. When the time error is reflected in the response time, the processor 120 may measure the distance to the external electronic device without considering the confidence level. In this case, operation 1123 may be omitted.

When the confidence level is not included in the additional response information, the processor 120 may measure the distance to the external electronic device, based on the response time in operation 1125. When the time error is reflected in the response time, the processor 120 may measure the distance to the external electronic device, based on the response time.

Figure 12:
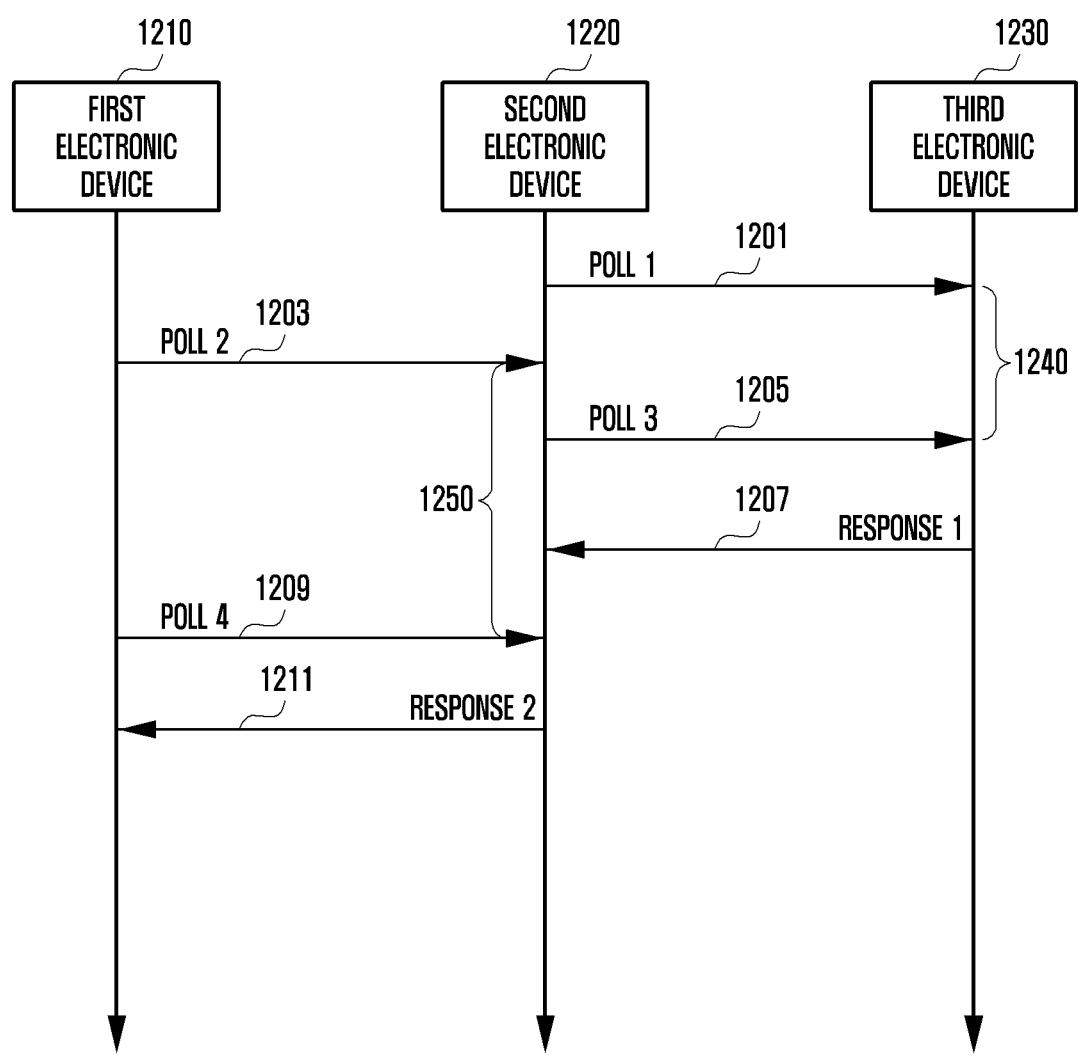
FIG. 12 is a flowchart illustrating an operating method between a plurality of electronic devices according to an embodiment of the disclosure.

FIG. 12 is a flowchart illustrating an operating method between a plurality of electronic devices according to an embodiment of the disclosure.

FIG. 12 illustrates an operation in which a first electronic device 1210, a second electronic device 1220, and a third electronic device 1230 perform UWB communication.

Referring to FIG. 12, in operation 1201, the second electronic device 1220 (e.g., the electronic device 101 of FIG. 1) may broadcast a first poll message (e.g., POLL 1) including a first distance measurement cycle 1240. The first distance measurement cycle 1240 may be a time from when the second electronic device 1220 transmits the first poll message (e.g., POLL 1) to when the second electronic device 1220 transmits a second poll message (e.g., POLL 3). The second electronic device 1220 may determine the first distance measurement cycle 1240, based on a first transmission offset. Operation 1201 has been described with reference to the foregoing drawings, and thus a detailed description thereof may be omitted.

In operation 1203, the first electronic device 1210 (e.g., the electronic device 102 of FIG. 1) may broadcast a first poll message (e.g., POLL 2) including a second distance measurement cycle 1250. The second distance measurement cycle 1250 may be a time from when the first electronic device 1210 transmits the first poll message (e.g., POLL 2) to when the first electronic device 1210 transmits a second poll message (e.g., POLL 4).

When receiving the first poll message (e.g., POLL 2) from the first electronic device 1210, the second electronic device 1220 may determine whether the message is a poll message, based on a frame type of the first poll response message (e.g., POLL 2).

In operation 1205, the second electronic device 1220 may broadcast a second poll message (e.g., POLL 3) including a third distance measurement cycle (not shown). The second electronic device 1220 may determine the third distance measurement cycle (not shown), based on a second transmission offset.

In operation 1207, the third electronic device 1230 (e.g., the electronic device 104 of FIG. 1) may transmit a first response message (e.g., RESPONSE 1) to the second electronic device 1220. The first response message may refer to a first response message transmitted by the third electronic device 1230 to the second electronic device 1220. The first response message (e.g., RESPONSE 1) may be transmitted to the second electronic device 1220 in a unicast manner. Response time information included in the first response message may have a time error applied thereto. The time error may occur because the second electronic device 1220 and the third electronic device 1230 are not temporally synchronized. The time error may be obtained by dividing the first distance measurement cycle 1040 by a time difference between poll messages (e.g., the first poll message (e.g., POLL 1) and the second poll message (e.g., POLL 3)). For example, the time difference between the poll messages may refer to a difference between a time when the third electronic device 1230 receives the first poll message (e.g., POLL 1) and a time when the third electronic device 1230 receives the second poll message (e.g., POLL 3). The third electronic device 1030 may transmit the first response message (e.g., RESPONSE 1) to the second electronic device 1220 by applying the time error to the response time information. The first response message (e.g., RESPONSE 1) has been described with reference to the foregoing drawings, and thus a detailed description thereof may be omitted.

When receiving the first response message from the third electronic device 1230, the second electronic device 1220 may determine whether the message is a response message, based on a frame type of the first response message. The second electronic device 1220 may measure a distance to the third electronic device 1230, based on a response time included in the first response message (e.g., RESPONSE 1).

In operation 1209, the first electronic device 1210 may broadcast a second poll message (e.g., POLL 3) including a second distance measurement cycle (not shown). The first electronic device 1210 may determine the second distance measurement cycle (not shown), based on a second transmission offset.

In operation 1211, the second electronic device 1220 may transmit a second response message (e.g., RESPONSE 2) to the first electronic device 1210. Response time information included in the second response message (e.g., RESPONSE 2) may have a time error applied thereto. The time error may occur because the second electronic device 1220 and the first electronic device 1210 are not temporally synchronized. The time error may be obtained by dividing the second distance measurement cycle 1250 by a time difference between poll messages (e.g., the first poll message (e.g., POLL 2) and the second poll message (e.g., POLL 4)). For example, the time difference between the poll messages may refer to a difference between a time when the second electronic device 1220 receives the first poll message (e.g., POLL 2) and a time when the second electronic device 1220 receives the second poll message (e.g., POLL 4). The second electronic device 1220 may transmit the second response message (e.g., RESPONSE 2) to the first electronic device 1210 by applying the time error to the response time information. The first response message has been described with reference to the foregoing drawings, and thus a detailed description thereof may be omitted.

When receiving the second response message (e.g., RESPONSE 2) from the second electronic device 1220, the first electronic device 1210 may determine whether the message is a response message, based on a frame type of the second response message (e.g., RESPONSE 2). The first electronic device 1210 may measure a distance to the second electronic device 1220, based on a response time included in the second response message (e.g., RESPONSE 2).

Figure 13:
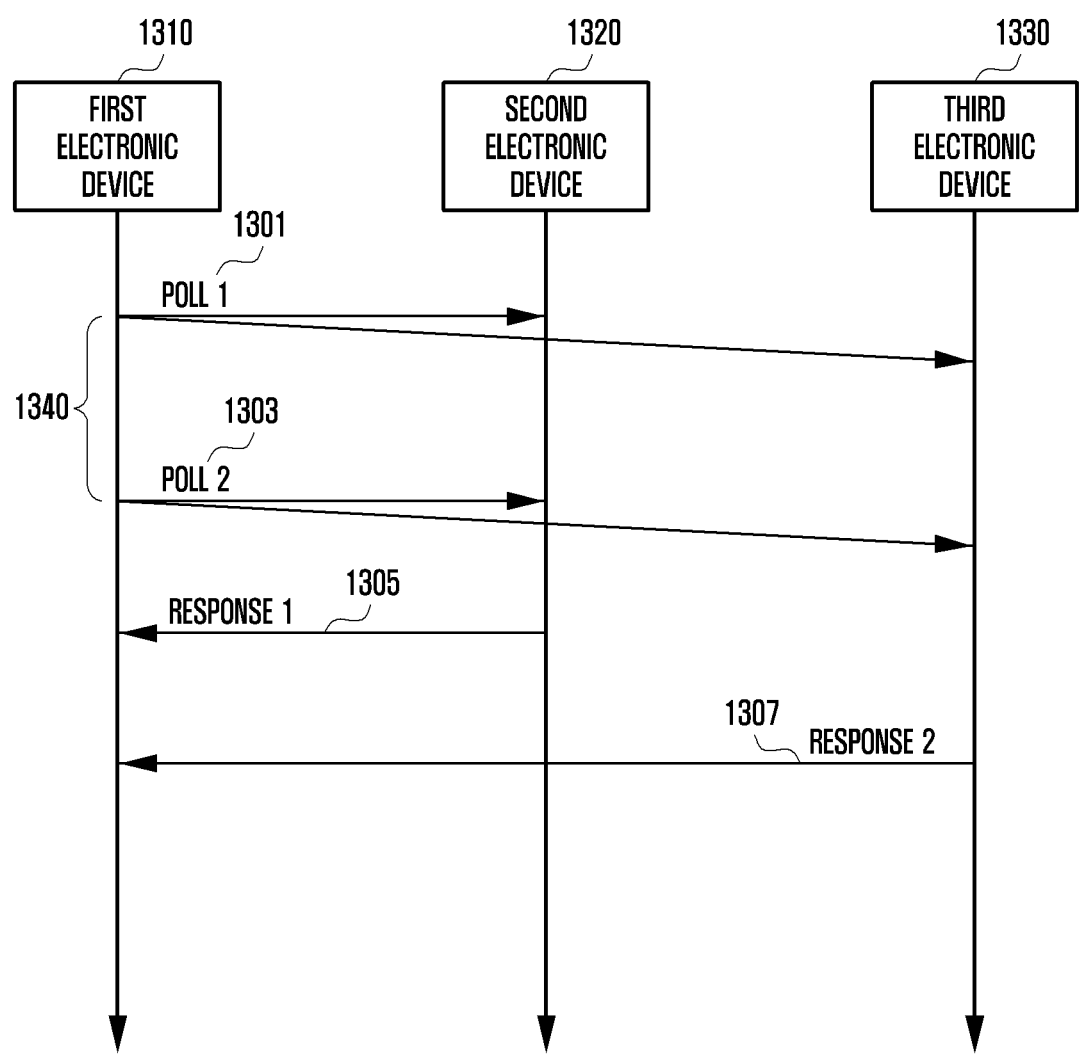
FIG. 13 is a flowchart illustrating an operating method between a plurality of electronic devices according to an embodiment of the disclosure.

FIG. 13 is a flowchart illustrating an operating method between a plurality of electronic devices according to an embodiment of the disclosure.

FIG. 13 illustrates an operation in which a first electronic device 1310, a second electronic device 1320, and a third electronic device 1330 perform UWB communication.

Referring to FIG. 13, in operation 1301, the first electronic device 1310 (e.g., the electronic device 101 of FIG. 1) may broadcast a first poll message (e.g., POLL 1). The first poll message may be transmitted to the second electronic device 1320 and the third electronic device 1330. Operation 1301 has been fully described with reference to the foregoing drawings, and thus a detailed description thereof may be omitted.

In operation 1303, the first electronic device 1310 may broadcast a second poll message (e.g., POLL 2) including a first distance measurement cycle 1340. The first distance measurement cycle 1340 may be a time from when the first electronic device 1310 transmits the first poll message (e.g., POLL 1) to when the first electronic device 1310 transmits the second poll message (e.g., POLL 2). The first electronic device 1310 may determine the first distance measurement cycle 1340, based on a first transmission offset. The second poll message may be transmitted to the second electronic device 1320 and the third electronic device 1330.

In operation 1305, the second electronic device 1320 (e.g., the electronic device 102 of FIG. 1) may transmit a first response message (e.g., RESPONSE 1) to the first electronic device 1310. The first response message may refer to a first response message transmitted by the second electronic device 1320 to the first electronic device 1310. The first response message (e.g., RESPONSE 1) may be transmitted to the first electronic device 1310 in a unicast manner. Response time information included in the first response message may have a time error applied thereto. The time error may occur because the first electronic device 1310 and the second electronic device 1320 are not temporally synchronized. The time error may be obtained by dividing the first distance measurement cycle 1340 by a time difference between poll messages (e.g., the first poll message (e.g., POLL 1) and the second poll message (e.g., POLL 2)). For example, the time difference between the poll messages may refer to a difference between a time when the second electronic device 1320 receives the first poll message (e.g., POLL 1) and a time when the second electronic device 1320 receives the second poll message (e.g., POLL 3). The second electronic device 1320 may transmit the first response message (e.g., RESPONSE 1) to the first electronic device 1310 by applying the time error to the response time information. The first response message (e.g., RESPONSE 1) has been fully described with reference to the foregoing drawings, and thus a detailed description thereof may be omitted.

In operation 1307, the third electronic device 1330 (e.g., the external electronic device 104 of FIG. 1) may transmit a first response message (e.g., RESPONSE 2) to the first electronic device 1310. The first response message may refer to a first response message transmitted by the third electronic device 1330 to the first electronic device 1310. The first response message (e.g., RESPONSE 2) may be transmitted to the first electronic device 1310 in a unicast manner. Response time information included in the first response message may have a time error applied thereto. The time error may occur because the first electronic device 1310 and the third electronic device 1330 are not temporally synchronized. The time error may be obtained by dividing the first distance measurement cycle 1340 by a time difference between poll messages (e.g., the first poll message (e.g., POLL 1) and the second poll message (e.g., POLL 2)). For example, the time difference between the poll messages may refer to the difference between the time when the third electronic device 1330 receives the first poll message (e.g., POLL 1) and the time when the third electronic device 1330 receives the second poll message (e.g., POLL 2). The third electronic device 1330 may transmit the first response message (e.g., RESPONSE 2) to the first electronic device 1310 by applying the time error to the response time information. The first response message (e.g., RESPONSE 2) has been fully described with reference to the foregoing drawings, and thus a detailed description thereof may be omitted.

An operating method of an electronic device according to various embodiments may include receiving a message by using at least one communication module of the electronic device, determining whether the received message is a poll message, calculating a time error and a response time when the received message is the poll message, and transmitting a response message including the response time to which the time error is applied to at least one external electronic device transmitting the poll message through the at least one communication module.

When the received poll message is a second poll message and a poll message received before the second poll message is a first poll message, the calculating of the time error may include calculating a difference between a time when the first poll message is received and a time when the second poll message is received, and dividing a first distance measurement cycle included in the first poll message by the calculated difference between the times.

Various embodiments disclosed in the specification and drawings are only intended to provide specific examples for easily describing the technical content of the disclosure and for assisting understanding of the disclosure, and are not intended to limit the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one communication module;
a memory; and
at least one processor operatively connected to the at least one communication module and the memory,
wherein the at least one processor is configured to:
broadcast a first poll message comprising a first distance measurement cycle by using the at least one communication module,
broadcast a second poll message comprising a second distance measurement cycle by using the at least one communication module,
receive a response message comprising a response time to which a time error is applied from at least one external electronic device, and
determine a distance to the at least one external electronic device, based on the response time to which the time error is applied.

2. The electronic device of claim 1, wherein the time error is calculated by calculating a difference between a time when the at least one external electronic device receives the first poll message and a time when the at least one external electronic device receives the second poll message, and dividing the first distance measurement cycle comprised in the first poll message by the calculated difference.

3. The electronic device of claim 2,
wherein the at least one processor is configured to further calculate the response time, based on a first transmission offset comprised in the first poll message or the response message, and
wherein the response message further comprises a confidence level of the response time.

4. The electronic device of claim 3, wherein the at least one processor is further configured to calculate the response time, based on at least one of a slot number for transmitting the response message, an offset number used to transmit the response message, or a time of one subslot.

5. The electronic device of claim 1, wherein the at least one processor is further configured to:
determine a contention phase or a transmission offset;
broadcast the first poll message comprising the contention phase or the transmission offset by using the at least one communication module;
receive at least one response message from the at least one external electronic device through the at least one communication module in response to the first poll message; and
change the contention phase or the transmission offset, based on the at least one response message.

6. The electronic device of claim 5,
wherein the at least one processor is further configured to change a time corresponding to the contention phase, based on a number of the at least one response message, and
wherein the time corresponding to the contention phase is configured to be shorter than a time of a cycle in which a distance is measured through designated communication.

7. The electronic device of claim 5, wherein the at least one processor is further configured to:
determine the distance to the at least one external electronic device or the second distance measurement cycle, based on the first response message;
receive at least one second response message comprising a response time to which the time error is applied from the at least one external electronic device; and
determine the distance to the at least one external electronic device, based on the response time comprised in the second response message.

8. The electronic device of claim 5, wherein the at least one processor is further configured to:
determine whether a time corresponding to the contention phase expires,
operate in a sleep state with respect to designated communication in case that the time corresponding to the contention phase expires,
wherein the sleep state includes deactivating a first communication,
determine whether a time for performing the designated communication expires while operating in the sleep state with respect to the designated communication, and
activate the designated communication in case that the time for performing the designated communication expires.

9. The electronic device of claim 5,
wherein the transmission offset comprises at least one of a number of transmission offsets, a transmission offset number, or reception offset configuration information, and
wherein the transmission offset number is an offset number used for the electronic device to transmit the second poll message comprising the changed contention phase or the changed transmission offset.

10. The electronic device of claim 9, wherein the reception offset configuration information is information for configuring whether the at least one external electronic device receiving the second poll message uses an offset number the same as the transmission offset number or randomly uses an offset number different from the transmission offset number when transmitting a response message to the second poll message.

11. An electronic device comprising:
at least one communication module;
a memory; and
at least one processor operatively connected to the at least one communication module and the memory,
wherein the at least one processor is configured to:
receive a first poll message comprising a first distance measurement cycle from an external electronic device by using the at least one communication module,
receive a second poll message comprising a second distance measurement cycle by using the at least one communication module,
calculate a time error and a response time, based on the first poll message or the second poll message, and
transmit a response message comprising the response time to which the time error is applied to the external electronic device through the at least one communication module.

12. The electronic device of claim 11, wherein the at least one processor is further configured to:
calculate the time error by calculating a difference between a time when the first poll message is received and a time when the second poll message is received; and
divide the first distance measurement cycle by the calculated difference.

13. The electronic device of claim 12, wherein the at least one processor is further configured to calculate the response time, based on a first transmission offset comprised in the first poll message or the response message.

14. The electronic device of claim 11,
wherein the at least one processor is configured to operate in a sleep state with respect to designated communication in case of having transmitted the response message,
wherein the sleep state includes deactivating the designated communication, and
wherein the at least one processor is configured to:
determine whether a time for performing the designated communication expires, and
activate the designated communication in case that the time for performing the designated communication expires.

15. A method of operating an electronic device, the method comprising:
receiving a message by using at least one communication module of the electronic device;
determining whether the received message is a poll message;
calculating a time error and a response time in case that the received message is the poll message; and
transmitting a response message comprising the response time to which the time error is applied to at least one external electronic device transmitting the poll message through the at least one communication module,
wherein, in case that the received poll message is a second poll message and a poll message received before the second poll message is a first poll message, the calculating of the time error comprises:
calculating a difference between a time when the first poll message is received and a time when the second poll message is received, and
dividing a first distance measurement cycle included in the first poll message by the calculated difference.

16. The method of claim 15,
wherein the calculating of the response time comprises calculating the response time, based on a first transmission offset comprised in the first poll message or the response message, and
wherein the response message further comprises a confidence level of the response time.

17. The method of claim 16, wherein the calculating of the response time comprises calculating the response time, based on at least one of a slot number for transmitting the response message, an offset number used to transmit the response message, or a time of one subslot.

* * * * *